United States Patent [19]

Cooper et al.

[11] 3,950,733
[45] Apr. 13, 1976

[54] INFORMATION PROCESSING SYSTEM

[75] Inventors: Leon N. Cooper; Charles Elbaum, both of Providence, R.I.

[73] Assignee: Nestor Associates, New York, N.Y.

[22] Filed: June 6, 1974

[21] Appl. No.: 477,080

[52] U.S. Cl. .......... 340/172.5; 235/150.1; 307/201; 340/146.3 T
[51] Int. Cl.² ................... G05B 13/02; G06G 7/12
[58] Field of Search ......... 235/150, 150.1; 307/201; 340/146.3 T, 172.5; 445/1

[56] References Cited
UNITED STATES PATENTS

| | | | |
|---|---|---|---|
| 3,275,986 | 9/1966 | Dunn et al. | 340/146.3 T |
| 3,408,627 | 10/1968 | Kettler et al. | 340/172.5 |

OTHER PUBLICATIONS

Widrow, B. et al. *Practical Applications for Adaptive Data Processing Systems,* In IEEE Wescon Conv. Rec., Vol. 7, 1963 pp. 1–3 and FIGS. 1, 5 and 7.

*Primary Examiner* — R. Stephen Dildine, Jr.
*Attorney, Agent, or Firm* — Brumbaugh, Graves, Donohue & Raymond

[57] ABSTRACT

An adaptive information processing system includes a module, called a *Nestor* module, having a plurality (N) of input terminals $1, 2 \ldots, j \ldots, N$, adapted to receive N input signals $s_1, s_2 \ldots, s_j \ldots, S_N$, respectively, and a plurality ($n$) of output terminals $1, 2 \ldots, i \ldots, n$, adapted to present $n$ output responses $r_1, r_2 \ldots, r_i \ldots, r_n$, respectively. A plurality of junction elements, called mnemonders, couple various ones (or a multiplicity) of the input terminals with various ones (or a multiplicity) of the output terminals. These mnemonders provide a transfer of information from an input terminal $j$ to an output terminal $i$ in dependence upon the signal $s_j$ appearing at the input terminal $j$ and upon the mnemonder transfer function $A_{ij}$. Means are provided for modifying the transfer function $A_{ij}$ of the mnemonders in dependence upon the product of at least one of the input signals and one of the output responses of the *Nestor* module. In a preferred embodiment of the invention, the modification to the transfer function of each mnemonder takes the form:

$$\delta A_{ij} = \eta\, s_j\, r_i = \eta\, s_j \sum_{k=1}^{n} A_{ik}\, s_k$$

where $\eta$ is a constant of proportionality.

103 Claims, 15 Drawing Figures

$$\delta A_{ij} = \eta r_i s_j = \eta s_j \sum_{k=1}^{N} A_{ik} s_k$$

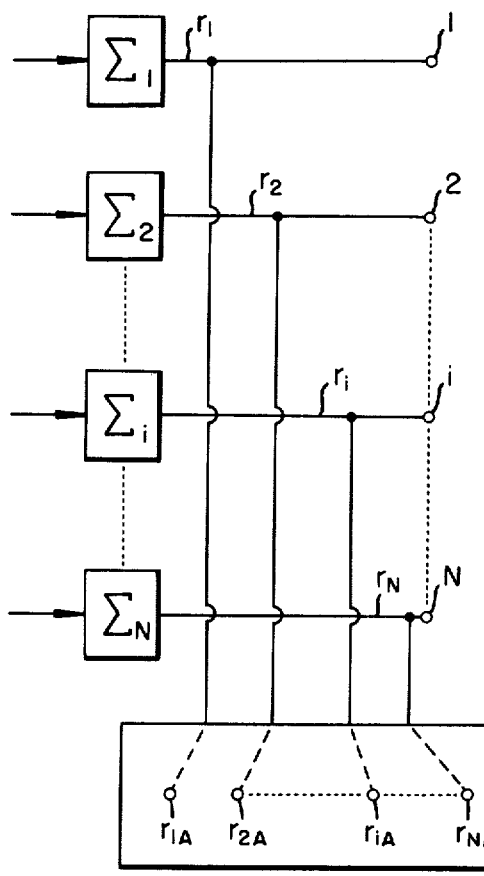
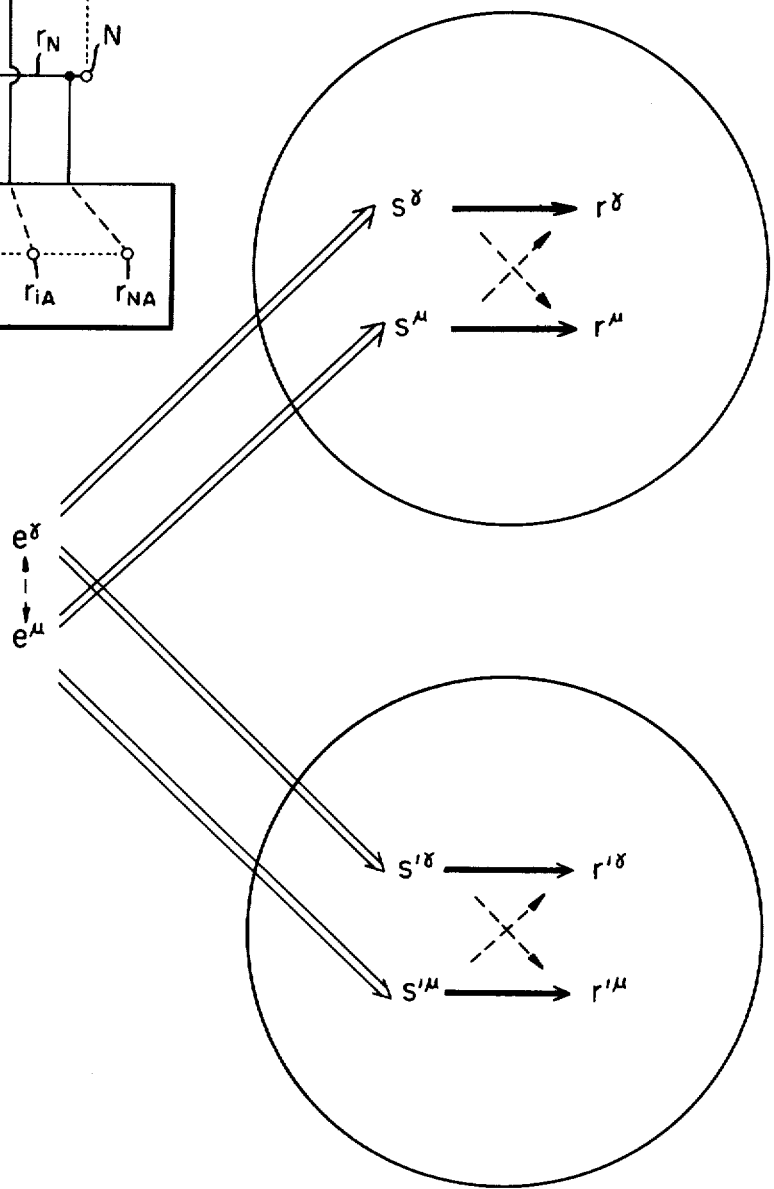
FIG. 9
FIG. 10

:

INFORMATION PROCESSING SYSTEM

FIELD OF INVENTION

The present invention relates to adaptive information processing systems, which systems are also known as learning machines, neuron networks, trainable systems, self-organizing devices, and/or adaptive memory systems or devices.

BACKGROUND OF THE INVENTION

Adaptive information processing systems have been extensively explored during the past several years. Some of the most notable systems include the Adaline and Madaline systems at Stanford Electronic Laboratory, the Perceptron at Cornell Aeronautical Laboratories, and the Minos I and II at Stanford Research Institute. Some of the U.S. patents which relate to adaptive information processing systems are U.S. Pat. No. 3,287,649 to Rosenblatt; U.S. Pat. No. 3,408,627 to Kettler et al.; U.S. Pat. No. 3,435,422 to Gerhardt et al.; U.S. Pat. No. 3,533,072 to Clapper; and U.S. Pat. No. 3,601,811 to Yoshino. This list of references is merely exemplary and constitutes only a small part of the large body of prior art in existence to date.

Such prior art adaptive information processing systems operate, in general, to produce an output response for a given input signal, which response is measured against some predetermined (correct) output response. These prior art systems are caused to modify themselves, or "learn", often in dependence upon the difference between the actual and the predetermined output response until the predetermined output response is achieved. The object of such a system is to have the system find its own way (by some algorithm) to a predetermined relation:

input signal → output response.

It should be noted here that whenever the term "input signal" is used in this discussion it is intended to include the possibility of a set of separate input signals which are applied, substantially simultaneously, to a corresponding set of input terminals of an information processing system. Similarly, the term "output response" is intended to define the entire system response to a given input signal, although this response may comprise a plurality of individual output responses appearing substantially simultaneously at a set of system output terminals.

A typical prior art adaptive system is illustrated in FIG. 1. This system comprises, as its essential elements, a network of inputs 1, 2, 3 . . . , N, which are respectively connected to a plurality of variable weighting elements $G_1, G_2, G_3 \ldots , G_N$ having variable weights which, for example may be variable gains in the case of weighting amplifiers or variable resistances in the case of variable resistors. The outputs of the weighting elements G are applied to a summer S which produces a single network output in proportion to the sum of the weighting element outputs. The weighting value of each weighting element $G_1, G_2, G_3 \ldots , G_N$ is individually controlled by means of a so-called "training algorithm" T that conditions the network to respond to a particular input signal with a desired output response.

In operation of the network, a particular signal is repetitively applied at the network inputs $1, 2, 3 \ldots , N$. After each application of the specific input signal, the network output response is compared to a predetermined desired output response, for example by means of a subtractor D, and the difference, or error, is utilized in the training algorithm to modify the weights of the individual weighting elements $G_1, G_2, G_3 \ldots , G_N$.

Each application of the specific input signal, and the subsequent modification of the weighting elements G, is called a "training cycle". As successive training cycles occur, the network output response approaches more closely the desired output response until the network is conditioned to respond uniquely to the particular input signal which is to provide the desired output response.

In the adaptive information processing systems of the prior art, emphasis has been given to finding a suitable training algorithm which permits a system to "learn" or adapt to the applied input signals at a rapid rate. Needless to say, numerous ingenious algorithms have been devised; however, in all cases the training algorithm has been made dependent in some way upon the predetermined desired output which is to be generated in response to a given input.

It is an object of the present invention to provide an adaptive information processing system which has the ability to construct its own distinctive output response for any given input signal. In particular, it is an object of the present invention to provide a system with the striking characteristic that it can modify itself to construct an internal mapping — input signal → output response — that functions as a memory or a program without any outside intervention or choice as to what output response is desired or what input pattern is presented. This type of training procedure or self-modification of the adaptive information processing system will hereinafter be called "passive learning" or "passive modification".

The importance of this ability of a system to passively modify itself will be appreciated by considering a simple example. Because it is not necessary with such a system to know, beforehand, a predetermined, desired output response for a given input signal, it is possible to apply input signals with *unknown* content to the system and, after a period of training, determine the informational content of the input signals by considering the output responses. For instance, if the unknown input signals happen to be informational signals (having some unknown structure) that are buried in noise, since the structure of the output responses is isomorphic to that of the buried informational signals, the unknown structure will be mapped into and be represented by the output responses. In this way the unknown informational content of any input signals may be deciphered by the information processing system.

It is also an object of the present invention to provide an adaptive information processing system which, like the systems of the prior art, can produce a predetermined, desired output response to any given input signal. This procedure, which will hereinafter be called "active learning" or "active modification", requires knowledge on the part of the human operator of the desired output response to be associated with each individual input signal.

It is a further object of the present invention to provide an adaptive information processing system in which the learning growth rate — that is, the rate at which the system trains itself to produce a particular output response in terms of the number of presentations of an input signal — is very rapid. In particular, it is an object of the present invention to provide an information processing system having an exponential, rather than linear or other slower, learning growth rate.

It is a further object of the present invention to provide an adaptive information processing system that is capable of functioning as a memory which is distributed and highly invulnerable to the malfunction of individual components. Such a memory will be an adaptive and self-organizing memory that has the ability to acquire information solely as a result of experience. In addition, this distributed memory in general will have the capacity, reliability and accuracy of a conventional digital computer memory (such as a ferrite core) of the type that stores information at a local site.

It is a further object of the present invention to provide an adaptive information processing system which is capable of great density of storage. For example, it is noted that the information processing system is capable of realization by integrated circuitry and does not require discrete elements such as ferrite cores.

It is a further object of the present invention to provide an adaptive information processing system which is capable of great rapidity of operation; more particularly, a system in which of the order of or more than $2^n$ bits of information can be recalled and/or processed in a single electronic operation (where $n$ is the number of system output terminals).

Finally, and perhaps most importantly, it is an object of the present invention to provide an adaptive information processing system which is capable of exhibiting each of the following properties:

1. *Recognition:* The ability to produce a strong output response to an event or input signal that the system has seen before. Obviously, the information processing system will initially respond diffusely to a particular input signal. However, after successive presentations of that input signal the system will learn to "recognize" the input signal by producing a characteristic output response.

2. *Recollection:* The ability to produce a unique output response for each of a number of particular input signals. This characteristic provides the function of memory since the system is thereby able to produce a unique output response on its ($n$) output terminals (containing of the order of or more than $2^n$ bits of information) upon receipt of a particular input signal on its set of input terminals.

3. *Generalization:* The ability to extract a common element from a number of different events or input signals. In particular, if a number of differing input signals are successively applied to the information processing system, the system will learn to recognize a feature that is common to these input signals. For example, if a particular informational signal that is buried in noise is repeatedly applied to the system input terminals, the system will extract, retain, and subsequently recognize the informational signal.

4. *Association:* The ability to recall a first input signal upon receipt of a second after the two input signals have been applied to the information processing system more or less concurrently. That is, when two input signals are simultaneously applied, the system will not only learn these input signals, but will "associate" one with the other. Thus, at a future time, the system will be able to recall either one or both of the input signals if only one of the input signals is applied. This characteristic of association can be effective, for example, in the analysis of unknown signals. If two unknown input signals are applied to the system, the system will be able to determine whether one is related to the other in any way.

5. *Retrieval From Partial (Fragmentary) Inputs:* The ability to retrieve an entire input signal from a portion of that input signal. This characteristic may be viewed as a "self-association"; that is, "association" between parts of the same signal. If a particular input signal is applied to the system until it is "learned", the system will "associate" any portion of this signal with the entire signal so that, at a later time, the application of a portion of the input signal will result in the production by the system of the entire signal (usually with a reduced signal to noise ratio).

BRIEF DESCRIPTION OF THE DRAWINGS

FIG. 9 is a block diagram illustrating output response-determining apparatus which may be used with a Nestor module according to the present invention.

FIG. 10 is a representational diagram showing the response of two Nestor modules to the same external fabric of events.

SUMMARY OF THE INVENTION

The various objects of the present invention, set forth above, may be achieved by providing an information processing module having a plurality (N) of input terminals $1, 2 \ldots, J \ldots, N$, adapted to receive N input signals $s_1, s_2, \ldots, s_j \ldots, s_N$, respectively; a plurality $(n)$ of output terminals $1, 2 \ldots, i \ldots, n$, adapted to present $n$ output responses $r_1, r_2 \ldots, r_i \ldots, r_n$, respectively; and a plurality of junction elements, called mnemonders, coupling various ones (or a multiplicity) of the input terminals with various ones (or a multiplicity) of the output terminals. According to the invention, each mnemonder effects a transfer of information from an input terminal $j$ to an output terminal $i$ in dependence upon the signal $s_j$ appearing at the input terminal $j$ and upon a so-called "transfer function" $A_{ij}$ of the mnemonder. Means are provided for modifying the matrix of transfer functions of the mnemonders in dependence upon the product of at least one of the input signals and one of the output responses of the module.

The term "transfer function", as it appears throughout the specification and claims herein, is used in its broad sense to define merely a function which modifies, in some way, the transfer of information (a signal) from the input to the output of a mnemonder. In the simplest case, the transfer function is equivalent to the gain or amplification of a mnemonder; however, it will be appreciated that a signal appearing at the input of a mnemonder may be modified in other ways to produce an appropriate mnemonder output signal. In any case, we shall specify the mnemonder output signal $s_j'$ as being the product of its input signal $s_j$ and the mnemonder transfer function $A_{ij}$, thus:

$$s_j' = A_{ij} s_j .$$

Figure 3:
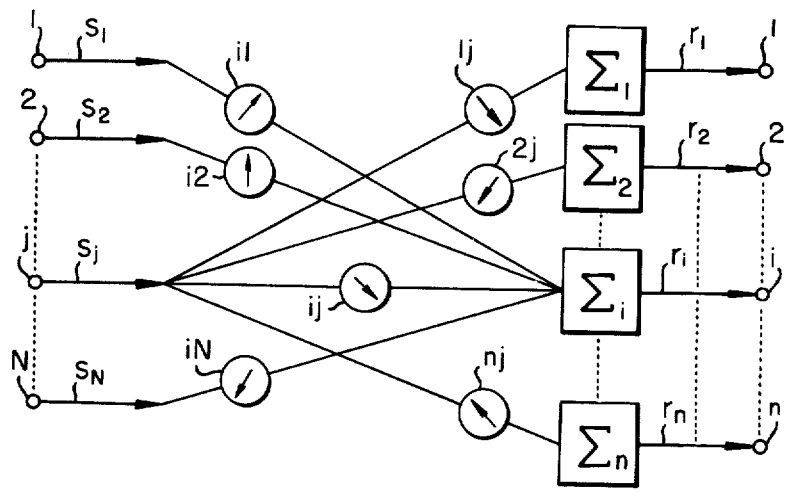
FIG. 3 is a block diagram of a Nestor module according to the present invention employing numerous nouveron networks of the type illustrated in FIG. 2. For clarity the feedback lines from the summers have been omitted.

A module of above described type, which will hereinafter be called a *Nestor* module, is illustrated in FIG. 3. FIG. 3 represents a particular module in which each of the N input terminals are connected to each of the n output terminals by a single mnemonder ($\ominus$). For the purposes of clarity, the feedback lines from the summers have been omitted and only the mnemonders coupled to the input terminal $j$ (mnemonders $1j, 2j \ldots , ij \ldots , nj$) and to the output terminal $i$ (mnemonders $i1, i2 \ldots , ij \ldots , iN$) are shown. It will be understood, however, that an array of $N \times n$ mnemonders are provided in this module so that the matrix of transfer functions $A_{ij}$ will be:

$$\begin{bmatrix} A_{11} & A_{21} & \ldots & A_{n1} \\ A_{12} & A_{22} & \ldots & A_{n2} \\ \vdots & \vdots & & \vdots \\ A_{1N} & A_{2N} & \ldots & A_{nN} \end{bmatrix}$$

The particular Nestor module, in which each of the N input terminals is connected to each of the $n$ output terminals by a single mnemonder, exhibits what is called (N, $n$) connectivity. In actual practice, one or more of the mnemonder connections between the input and output terminals may be severed without harmful degradation of module function. In fact, the connections between the input terminals and output terminals via the mnemonders may be entirely random, provided that a sufficient number of connections (mnemonders) are present to provide for the transmission of information from input to output and for the storage of information in the mnemonders.

In a preferred embodiment of the Nestor module according to the present invention, the response $r_i$ at each output terminal is a linear function of the inputs applied thereto so that:

$$r_i = \sum_{j=1}^{N} A_{ij} s_j .$$

This linear relation, which is indicated in FIG. 3 by means of the summers $\Sigma_1, \Sigma_2 \ldots , \Sigma_i \ldots , \Sigma_n$, is the simplest relationship which gives the desired results. It will be understood, however, that the Nestor module is not restricted to this linear relation and that other powerful results may be obtained if the output response $r_i$ at one or more output terminals $i$ is made a different function of the inputs supplied thereto. For example, the output response $r_i$ may be made proportional to the product of the inputs $A_{ij} s_j$, over all $j$.

In the Nestor module illustrated in FIG. 3, the numbers of input terminals N and output terminals $n$, respectively, may assume any values. The number of input terminals may exceed the number of output terminals, or vice versa, or they may be equal (N=$n$). It will be understood that the amount of information which may appear at any given time at the output terminals of the Nestor module is of the order of or larger than $2^n$ bits and, further, that the higher the value of $n$, the greater will be the signal to noise ratio of the module. It is therefore desirable to make $n$ reasonably large, taking into consideration the necessity for a commensurate increase in the number of circuit elements. Thus, for convenience, in a later discussion $n$ will be assumed to be equal to N.

Figure 1:
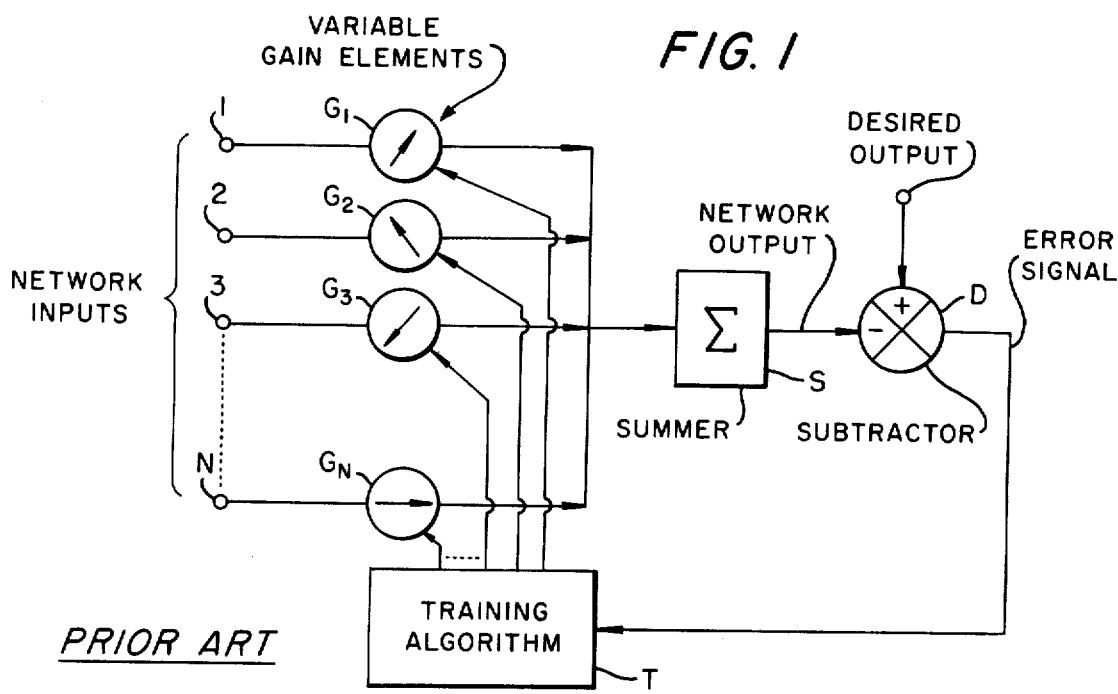
FIG. 1 is a block diagram of a typical prior art information processing network.
Figure 2:
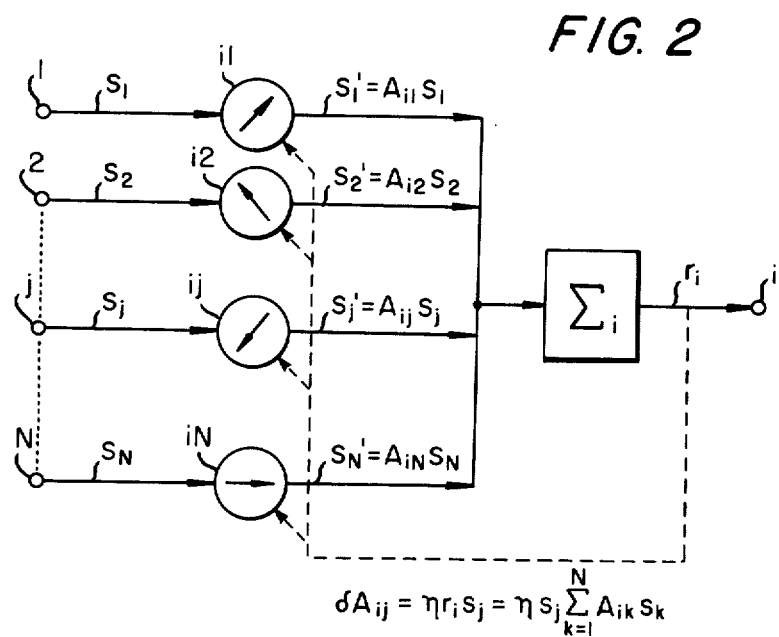
FIG. 2 is a block diagram of a nouveron network according to the present invention.

The Nestor module shown in FIG. 3 may be represented by, or considered to be comprised of a plurality $(n)$ of summers $\Sigma_i$ each having, associated therewith, a plurality (N) of input terminals and mnemonders and a single output terminal $i$. Such a subcomponent of the Nestor module, hereinafter called a "nouveron", is illustrated in FIG. 2. By comparing FIG. 2 with FIG. 3, it may be noted that the Nestor module comprises a plurality $(n)$ of nouverons of the type illustrated in FIG. 2.

As shown in FIG. 2, each nouveron produces a single output response $r_i$ at an output terminal $i$. This output response is generated by the nouveron summer $\Sigma_i$ in dependence upon the outputs $s_1', s_2' \ldots , s_j' \ldots , s_N'$ of the N mnemonders $i1, i2 \ldots , ij \ldots , iN$, respectively.

As mentioned above, it is not necessary that the mnemonders of the Nester module couple every input terminal to every output terminal of the module. Consequently, the nouveron illustrated in FIG. 2 may comprise fewer than N mnemonders so that not every one of the input terminals $1, 2 \ldots , j \ldots , N$ will be coupled to the summer $\Sigma_i$.

Also as mentioned above, in the learning mode the transfer function $A_{ij}$ of at least one (and preferably all) of the mnemonders $ij$ of the Nestor module is modified in dependence upon the product of at least one of the input signals and one of the output responses of the module. This algorithm for the modifications to A (apart from uniform decay unrelated to the inputs and outputs) may be written:

$$\delta A_{ij} = f(s_1, s_2 \ldots , s_j \ldots , s_N; r_1, r_2 \ldots , r_i \ldots , r_n),$$

where it is understood that the function f may be dependent upon only one of the input signals $s_1, s_2 \ldots, s_j \ldots, s_N$ and only one of the output responses $r_1, r_2 \ldots, r_i \ldots, r_n$. To avoid any unnecessary complication in wiring the Nestor module, we prefer to make the modifications to the transfer function $A_{ij}$ of a mnemonder dependent only upon the input signals to and output response of the nouveron of which that mnemonder is a part. Therefore, in a preferred embodiment of the present invention, we make the modifications to $A_{ij}$ dependent upon the signal $s_j$ and the output response $r_i$ associated with the particular mnemonder; i.e.:

$$\delta A_{ij} = f(s_j, r_i),$$

where it is understood here that the function $f$ is always dependent upon both of the variables $s_j$ and $r_i$.

The function $f(s_j, r_i)$ may be expanded using Taylor's formula for functions of several variables. If this is done, we have $$f(s_j, r_i) = a_{00} + a_{01} s_j + a_{10} r_i + a_{11} r_i s_j + a_{21} r_i^2 s_j + a_{31} r_i^3 s_j \ldots \Sigma a_{mn} r_i^m s_j^n .$$

The first three terms of the Taylor expansion are of no immediate interest to us since we require the modifications to $A_{ij}$ to be dependent upon the product of the input signal $s_j$ and output response $r_i$. It may be proven that a modification to $A_{ij}$ which is a function of one or more of the first three terms only of the Taylor expansion does not result in an information processing system having the properties of intelligence exhibited by the Nestor module.

The lowest term of the Taylor expansion which does result in the desired properties according to the present invention is the fourth term; namely $a_{11} r_i s_j$. This term (which, because it is readily amenable to rigorous analytic treatment will be treated in depth in the discussion that follows) yields a modification to $A_{ij}$ in the following form:

$$\delta A_{ij} = \eta \, r_i \, s_j,$$

where $\eta$ is the constant of proportionality.

It will be understood, however, that other terms of the Taylor expansion above the third term may also produce powerful results when employed in the Nestor module. Terms with even powers of the variables, $s_j$ or $r_i$, do not provide polarity discrimination in the modifications. Terms containing odd powers of these variables such as the sixth term $a_{31} r_i^3 s_j$, do provide this discrimination. Either can impart interesting properties to the Nestor module. In particular, since the various terms of the Taylor expansion yield different weightings in the modifications to A, these weightings can be used to advantage to obtain specific desired properties.

Figure 4:
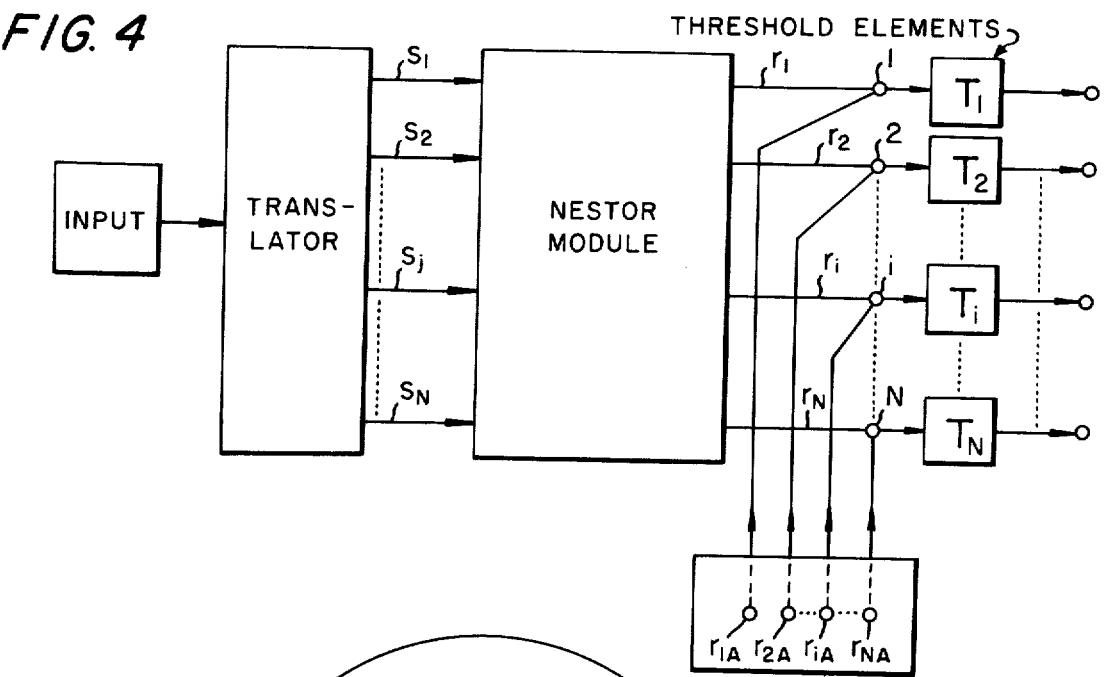
FIG. 4 is a block diagram of an information processing system incorporating a Nestor module of the type illustrated in FIG. 3.

FIG. 4 illustrates one way in which a Nestor module according to the present invention may be connected and utilized in an adaptive information processing system. The Nestor module shown in this figure exhibits (N, N) connectivity; that is, the module comprises N input terminals and N output terminals and each of the input terminals is connected to each of the output terminals via a mnemonder as represented in FIG. 3.

The input signals $s_1, s_2 \ldots, s_j \ldots, s_N$ to the Nestor module characterize an "event" in the environment designated in FIG. 4 as the "input". This event can be an optical event, such as the sight of a pattern, an auditory event, such as the hearing of a tone, or any other imaginable or unimaginable event, for example the receipt of radiation signals from outer space. The only requirement for the event is that it be translatable in some way into a plurality of input signals $s_1, s_2 \ldots, s_j \ldots, s_N$ which retain sufficient detail about the event to be of interest. The signals $s_1, s_2 \ldots, s_j \ldots, s_N$ are generated by a translator which performs some kind of analysis of the event and produces signals in response to this analysis. As an example, if the input is an optical event or "scene", the translator may divide the scene into a plurality of raster elements and produce signals $s_1, s_2 \ldots, s_j \ldots, s_N$ in proportion to the optical density at each respective raster element. If the input is an auditory event, the translator may perform a Fourier analysis of the auditory information and produce signals $s_1, s_2 \ldots, s_j \ldots, s_N$ in proportion to the amplitude of sound at each of the Fourier frequencies. It will be understood, however, that the translator to be used with the Nestor module is entirely a matter of choice and that numerous types of translators are well known in the art. Furthermore, since the translator per se forms no part of the present invention, it will not be discussed herein in detail.

As noted above, the Nestor module produces a plurality of output responses $r_1, r_2 \ldots, r_i \ldots, r_N$ in response to a set of input signals $s_1, s_2 \ldots, s_j \ldots, s_N$. In a preferred embodiment of the present invention these output responses are continuous variables; that is, they may assume values from zero to any positive and/or negative maximum value determined by real world constraints that are dictated by the construction of the Nestor module.

If desired, in order to "force" the Nestor module to assume a particular output response (set of individual responses $r_1, r_2 \ldots, r_i \ldots, r_N$) upon the presentation of a particular input signal (set of individual signals $s_1, s_2 \ldots, s_j \ldots, s_N$), the information processing system may be provided with a suitable arrangement for impressing or appplying specific responses (e.g., voltages) $r_{1A}, r_{2A} \ldots, r_{iA} \ldots, r_{NA}$ to selected ones or all of the output terminals $1, 2, \ldots, i \ldots, N$. In this way, the Nestor module may be operated in the "active learning" mode and caused to provide a predetermined desired output response to any given input signal.

Also, if desired, the output terminals $1, 2 \ldots, i \ldots, N$ of the Nestor module may be connected to a plurality of threshold elements $T_1, T_2 \ldots, T_i \ldots, T_N$, respectively, such as Schmitt triggers or the like, which produce an output signal if the output response applied thereto exceeds an adjustable threshold level $\theta_1, \theta_2 \ldots, \theta_i \ldots, \theta_N$, respectively. These threshold elements effectively convert the analog output response of the module into a digital output signal which may be conveniently used in subsequent processing. In addition, these threshold elements serve a decisional function to determine if and when a particular output response has been generated.

The threshold elements $T_1, T_2 \ldots, T_i \ldots, T_N$ may also be utilized in a mode of operation, which may be termed a "suppression mode", that assists in training the Nestor module. As will be discussed in detail hereinafter, this mode of operation requires the output of each of the threshold elements to be fed back to the Nestor module to inactivate all summers except the summer producing the output. In this way, all of the output responses $r_1, r_2 \ldots, r_N$ except that response $r_i$ applied as an input to the threshold element $T_i$ which is producing an output signal, will be suppressed. The advantage of this is that the Nestor module will thereby rapidly train itself to produce a pattern of output responses $r_1, r_2 \ldots, r_i \ldots, r_N$ (and therefore output responses from the threshold elements $T_1, T_2 \ldots, T_N$) in which only one of these responses is non-zero upon the presentation of a given set of input signals $s_1, s_2 \ldots, s_j \ldots, s_N$.

The output terminals of the Nestor module, or of the threshold elements $T_1, T_2 \ldots, T_N$, if these are provided, may be connected to any type of output device or processor depending upon the action to be taken in dependence upon the output responses of the module. If the Nestor module is utilized to identify visual patterns for example (such as bank check signatures), the outputs of the threshold elements may simply be connected to an alarm device which advises a human operator when a particular pattern has, or has not, been detected (e.g., a valid or a fraudulent signature). If the Nestor module is utilized as a pure distributed memory for example, it may be coupled directly to a conventional digital computer (i.e., without a separate translator at the input side or threshold elements at the output side). A digital-to-analog converter must, of course, be provided at the input interface of the module to convert the digital computer output to analog input signals $s_1, s_2 \ldots, s_N$; and an analog-to-digital converter must be provided at the output interface of the module to quantize the analog output responses $r_1, r_2 \ldots, r_N$ for input to the computer.

Obviously, the Nestor module is capable of being used for a practically infinite number of purposes and the particular output device or processor employed will be determined by the particular circumstances of each case. Since the output device or processor per se forms no part of the present invention it will not be described herein in any further detail.

The Nestor module, according to the present invention, may be employed in an information processing system in which several modules are connected together either in series or in parallel, or in series/parallel. For example, the output terminals of two modules may be connected to the input terminals of a third module so that the first two modules may "pre-process" information received from the environment and pass this information to the third module for ultimate processing and storage. Series connections and parallel connections between modules may thus increase the intellectual power of the information processing system.

The Nestor module, according to the present invention, may be constructed to "learn" at a desired rate. In the learning mode, the modifications to the transfer functions $A_{ij}$ of the mnemonders should be as defined above; in a preferred embodiment, these modifications take the form:

$$\delta A_{ij} = \eta \, r_i \, s_j .$$

By adjusting the value of $\eta$, for example, it is possible to control the rate of modification, or rate of "learning" of the module. By setting $\eta = 0$ ($\delta A_{ij} = 0$) it is also possible to completely "turn off" the learning mode of the module so that the module operates as a pure distributed memory. The use of the Nestor module in this memory mode, in which the transfer functions $A_{ij}$ are predetermined and fixed, is one of the important features of the present invention.

The Nestor module, according to the present invention, may also be constructed to "forget" at a predetermined rate, as well as to learn. Such operation may be accomplished by permitting the values of the transfer functions $A_{ij}$ to decay, for example at a constant rate. When in a learning mode such a loss of stored information is helpful since the Nestor module may thereby "forget" details of its previous experience and then generalize more rapidly. Conversely, after the Nestor module has been trained and it is operating in a memory mode, it is desirable to reduce any decay of the transfer functions $A_{ij}$ to "zero" (that is, the lowest value possible with existing components) so that the information stored in the Nestor module may be retained as long as possible without use of a buffer.

Figure 8:
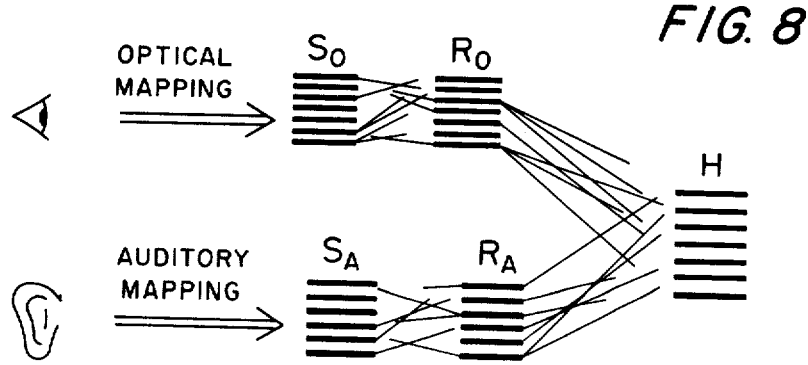
FIG. 8 is a representational diagram of an optical-auditory system incorporating a plurality of Nestor modules according to the present invention.

When utilizing a plurality of Nestor modules connected in series or in parallel, different modules may be operated in different modes to carry out different functions within an information processing system. For example, one or more modules may be operated in an information processing or learning mode (e.g., where $\eta$ as well as the rate of uniform decay are reasonably large) while one or more modules may be operated in a pure memory mode ($\delta A_{ij}$ and the rate of decay are zero). FIG. 8 shows an example of one such system consisting of three Nestor modules. Referring to that figure it is apparent that the number of inputs of the bank H can be equal to, larger than or smaller than the sum of the outputs of $R_O$ and $R_A$, and that each output of $R_O$ and $R_A$ can be connected to one or more inputs of H in an ordered or random fashion.

Finally, it will be appreciated that once a Nestor module has been "trained" after a period of operation in the learning mode, the values of the transfer functions $A_{ij}$ may be stored and used to instantly train another Nestor module. This "instant training" is accomplished simply by setting the values of the transfer functions $A_{ij}$ of a Nestor module to initial values $A_{ij}^{(0)}$ before the module is placed into operation.

In a preferred embodiment of the present invention, the information processing system is provided with a conventional buffer storage device (either analog or digital) to which the values of the transfer functions $A_{ij}$ may be transferred from a trained module, and from which these values may be taken when the transfer functions of the same or a different module are set to their initial values $A_{ij}^{(0)}$.

Having stated and described the basic struture of the Nestor module and of the information processing system according to the present invention, it is now necessary to consider the nature and operation of this structure in detail. Accordingly, in the Detailed Description of the Invention that follows, we will explore the various properties exhibited by this module and this system.

DETAILED DESCRIPTION OF THE INVENTION

The present invention will now be described in detail wiith reference to FIGs. 5 – 14 of the drawings. Presented immediately below is a discussion of the theoretical basis for the invention; there follows a description of a specific preferred embodiment for realizing the invention.

I. THEORETICAL EXPLANATION

A. Space of Events and Representations

Figure 5:
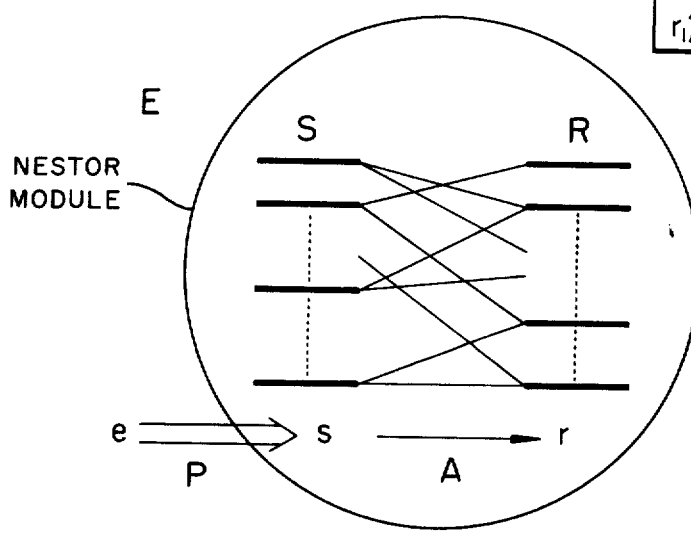
FIG. 5 is a representational diagram illustrating the response of a Nestor module according to the present invention to an external fabric of events.

Reference is made to FIG. 5 which illustrates a Nestor module that is subjected to an environment constituted by a number of "events". The duration and extent of an "event" will finally be defined self-consistently in terms of the interaction between the environment and the adaptive system containing the Nestor module. For easier description, however, we proceed initially as though an event were a well-defined objective happening and envision a space of events E labeled $e^1, e^2, e^3 \ldots e^k$. These events are "mapped" by the sensory and early processing devices of the adaptive system through an external mapping P (for "processing") into a signal distribution in the Nestor input space S labeled $s^1, s^2, s^3 \ldots s^k$. The external mapping P is denoted by the double arrow in FIG. 5. For the time being, we assume that this external mappiing is not modified by experience.

Although we need not describe the mapping P in any detail, since the particular type of translation from the environment to the input space is not important for our discussion, we note that this external mapping should be rich and detailed enough so that a sufficient amount of information is preserved to be of interest. In particular, the set of inputs S should reflect the degree of "separation" between events: that is, the degree of similarity (or other relationship) in any aspect of two or more events. We thus assume that the external mapping P from E to S has the fundamental property of preserving, in a sense, the "closeness" or "separateness" of events.

We now define a set of input signals $s^\nu$ which correspond to the $\nu$th incoming event $e^\nu$, and a set of input signals $s^\mu$ which correspond to the $\mu$th incoming event $e^\mu$. In this notation two events $e^\nu$ and $e^\mu$ map into inputs $s^\nu$ and $s^\mu$ whose separation is related to the separation of the original events. In a vector representation, which will be employed throughout this discussion, we imagine that two events as similar as a white cat and grey cat map into vectors which are close to parallel while two events as different as the sound of a bell and the sight of food map into vectors which are close to orthogonal to each other.

Given the input signal distribution in S which is the result of an event in E, we imagine that this signal distribution is internally mapped onto a set R of output responses by an internal mapping A denoted by the single arrow in FIG. 5. This latter type of mapping is modifiable in a manner to be described in detail below.

Figure 6:
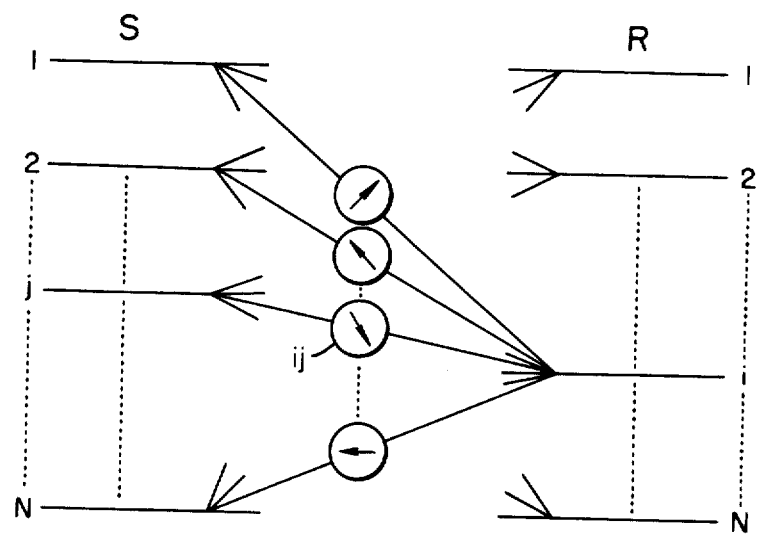
FIG. 6 is a representational diagram illustrating the signal flow in an ideal Nestor module according to the present invention.

The actual connections between the inputs s and outputs r of the Nestor module may be random and redundant; there may be many or no connections between a particular input and output. However, for the purposes of discussion we idealize the network by replacing any multiplicity of connections between an input and output by a single junction ⊕, called a mnemonder, that summarizes logically the effect of all of the information transferred forward between the input terminal $j$ in the S bank and the output terminal $i$ in the R bank. As is illustrated in FIG. 6, each of the N inputs in S is connected to each of the N outputs in R by a single mnemonder ⊕. The summers work so that the response or the signal on any output terminal, say $i$ in R, namely $r_i$, is mapped from the signals $s_j$ on all the input terminals in S by:

$$r_i = \sum_{j=1}^{N} A_{ij} s_j$$

where $A_{ij}$ is the transfer function of the $ij^{th}$ junction or mnemonder ⊕. This is the fundamental relation which gives the influence of input signals in S on the output signals in R. Although the satisfactory functioning of the Nestor module does not require so specific an assumption (i.e., $r_i$ need not be a linear function of all N inputs), the simplicity of this relation makes it easier to display the results in an explicit analytic form.

B. Associative Mapping, Memory and Logical Processes

It is in modifiable, internal mappings of the type A that the experience and memory of the Nestor module are stored. In contrast with present machine memory which is local (an event stored in a specific place) and addressable by locality (requiring some equivalent of indices and files) the Nestor module memory is distributed and addressable by content or by association. We shall show below that the mapping A can have the properties of a memory that is non-local, content addressable and in which "logic" is a result of association and an outcome of the nature of the memory itself.

The mapping A is most easily written in the basis of the mapped vectors the system has experienced. In a preferred algorithm, A may be defined as:

$$A = \sum_{\mu\nu} c_{\mu\nu} \; r^\mu \times s^\nu ,$$

where the corresponding sets of output signals for the $\nu$th and $\mu$th events $e^\nu$ and $e^\mu$ are $r^\nu$ and $r^\mu$, respectively, and the parameter $c_{\mu\nu}$ is the coefficient of coupling between the $\nu$th input signals $s^\nu$ and the $\mu$th output signals $r^\mu$. As we shall see, the coefficient c normally grows with time as successive events $e$ are mapped into the inputs s.

The $ij^{th}$ element of A gives the strength of the mnemonder between the incoming signal $s_j$ in the S bank and the outgoing response $r_i$ in the R bank. Thus, if only $s_j$ is non-zero:

$$r_i = A_{ij} s_j.$$

Since $$A_{ij} = \sum_{\mu\nu} c_{\mu\nu} \; r_i^\mu s_j^\nu$$

the $ij^{th}$ mnemonder strength is composed of the entire experience of the system as reflected in the input and output signals connected to this mnemonder. Each experience or association $(\mu\nu)$, however, is stored over the entire array of N × N mnemonders. This is the essential meaning of a distributed memory. Each event is stored over a large portion of the system, while at any particular local point many events are superimposed.

1. Recognition and Recollection: The fundamental problem posed by a distributed memory is the address and accuracy of recall of the stored events. Consider first the "diagonal" portion of A which is defined as follows:

$$(A)_{diagonal} \equiv R \equiv \Sigma\, c_{\mu\nu}\, r^\nu \times s^\nu$$

(where the script R stands for "recognition and recollection").

An arbitrary event, $l$, mapped into the input signals, will generate the response in R:

$$r = A\, s$$

If we equate recognition with the strength of this response $r$, say the value of $$(r, r) = \sum_{i=1}^{N} r_i^2$$

(the "inner product" of the vector $r$ with itself, i.e., the square of the length of $r$), then the mapping A will distinguish between those events it contains (the $s^\nu$, $\nu = 1, 2 \ldots k$) and other events which are separated from these.

The word "separated" used in this context now requires a more precise definition. In a type of argument used by J. A. Anderson, Math. Bio-sciences 8, 137 (1970), in analyzing a distributed memory, the vectors $s^\nu$ are assumed to be independent of one another and to satisfy the requirements that on the average $$\sum_{i=1}^{N} s_i^\nu = 0$$

$$\sum_{i=1}^{N} (s_i^\nu)^2 = 1.$$

Any two such vectors have components which are random with respect to one another so that a new vector, $s$, presented to R above gives a noise-like response since on the average $(s^\nu, s)$ is small. The presentation of a vector seen previously, say $s^\lambda$, however, gives the response $$R\, s^\lambda = c_{\lambda\lambda}\, r^\lambda + \text{noise}$$

It is then shown that if the number of imprinted events, $k$, is small compared to N, the signal to noise ratios are reasonable.

If we define separated events as those which map into orthogonal vectors, then clearly a recognition matrix composed of $k$ orthogonal vectors $s^1, s^2 \ldots s^k$ $$R = \sum_{\nu=1}^{k} c_{\nu\nu}\, r^\nu \times s^\nu$$

will distinguish between those vectors contained, $s^1 \ldots s^k$, and all vectors separated from (perpendicular to) these. Further, the response of $R$ to a vector previously recorded is unique and completely accurate:

$$R\, s^\lambda = c_{\lambda\lambda}\, r^\lambda .$$

In this special situation the distributed memory is as precise as a localized memory.

In addition, as has been pointed out by H. C. Longuet-Higgins, Proc. R. Soc. Lond. B, 171 327 (1968), a distributed memory may have the interesting property of recalling an entire response vector $r^\lambda$ even if only part of the signal $s^\lambda$ is presented. This is the case for the distributed memory discussed here. Let $$s^\lambda = s_1^\lambda + s_2^\lambda$$

If only part of $s^\lambda$, say $s_1$, is presented, we obtain $$R\, s_1^\lambda = c_{\lambda\lambda}\, (s_1^\lambda, s_1^\lambda)\, r^\lambda + \text{noise}.$$

The result is thus the entire response to the full $s^\lambda$ with a reduced coefficient plus noise.

2. Association: The presentation of the event $e^\nu$ which generates the vector $s^\nu$ results in recognition and recollection if $$R\, s^\nu = c\, r^\nu + \text{noise}$$

Then the off-diagonal terms $$(A)_{off\text{-}diagonal} \equiv A \equiv \sum_{\mu \neq \nu} c_{\mu\nu}\, r^\mu \times s^\nu$$

(where the script A stands for "association") may be interpreted as leading to the asssociation of events initially separated from one another

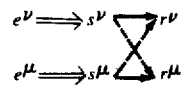

where $(s^\nu, s^\mu) = 0$.

For with such terms the presentation of the event $e^\nu$ will generate not only $r^\nu$ (which is equivalent to recognition of $e^\nu$) but also (perhaps more weakly) $r^\mu$ which should result with the presentation of $e^\mu$. Thus, for example, if $r^\mu$ will initiate some response (originally a response to $e^\mu$) the presentation of $e^\nu$ when $c_{\mu\nu} \neq 0$ will also initiate this response.

We, therefore, can write the association matrix:

$$A = \sum_{\mu\nu} c_{\mu\nu}\, r^\mu \times s^\nu = R + A,$$

where $$R = (A)_{diagonal} \equiv \sum_{\nu} c_{\nu\nu}\, r^\nu \times s^\nu \quad (\text{recognition})$$

and $$A = (A)_{off\text{-}diagonal} \equiv \sum_{\mu \neq \nu} c_{\mu\nu}\, r^\mu \times s^\nu \quad (\text{association}).$$

The $c_{\mu\nu}$ are then the "direct" recognition and association coefficients.

3. Generalization: In actual experience the events to which the system would be exposed would not in general be highly separated or independent in a statistical sense. There is no reason, therefore, to expect that all vectors, $s^\nu$, printed into A would be orthogonal or even very far from one another. Rather, it seems likely that often large numbers of these vectors would lie close to one another. Under these circumstances a distributed memory of the type contained in A will become confused and make errors. It will "recognize"

and "associate" events never in fact seen or associated before.

To illustrate, assume that the system has been exposed to a class of non-separated events $\{e^1 \ldots e^k\}$: $\{e^\alpha\}$ which map into the $k$ vectors $\{s^1 \ldots s^k\}$: $\{s^\alpha\}$. The closeness of the mapped events can be expressed in a linear space by the concept of "community". We define the community of a set of vectors, such as $\{s^\alpha\}$ above, as the lower bound of the inner products $(s^u, s^t)$ of any two vectors in this set. Specifically, the community of the set vectors $\{s^\alpha\}$ is $\tau$, $C[s^\alpha] = \tau$, if $\tau$ is the lower bound of $(s^u, s^t)$ for all $s^u$ and $s^t$ in $\{s^\alpha\}$.

If each exposure results in an addition to A (or to R) of an element of the form $c_{\nu\nu} \quad r^\nu \times s^\nu$, then the response to an event $s^u$ from this class, $s^u \in \{s^\alpha\}$, is $$R s^u = r = \Sigma c_{\nu\nu} \quad r^\nu \quad (s^\nu, s^u) = C_{uu} r^u + \sum_{\nu \neq u} (s^\nu, s^u) c_{\nu\nu} \quad r^\nu$$

where $$(s^\nu, s^u) > \tau.$$

If $\tau$ is large enough the response to $s^u$ is, therefore, not very clearly distinguished from that of any other $s$ contained in $\{s^\alpha\}$.

If a new event, $e^{k+1}$, not seen before is presented to the system and this new event is close to the others in the class $\alpha$, (for example, suppose that $e^{k+1}$ maps into $s^{k+1}$ which is a member of the community $\{s^\alpha\}$) then $R\ s^{k+1}$ will produce a response not too different from that produced for one of the vectors $s^u \in \{s^\alpha\}$. Therefore, the event $e^{k+1}$ will be recognized though not seen before.

This, of course, is potentially a very valuable error. For the associative memory recognizes and then attributes properties to events which fall into the same class as events already recognized. If, in fact, the vectors in $\{s^\alpha\}$ have the form $$s^\nu = s^0 + n^\nu$$

where $n^\nu$, the noise factor, varies randomly, $s^0$ will eventually be recognized more strongly than any of the particular $s^\nu$ actually presented. In this way, for example, a repeated signal can be extracted from random noise.

We have here an explicit realization of what might loosely be called a "logic" — which, of course, is not logic at all. Rather, what occurs might be described as the result of a built-in directive to generalize. The associative memory by its nature takes the step $$s^0 + n^1, s^0 + n^2 \ldots s^0 + n^k \rightarrow s^0$$

which may be described in language as passing from particulars (e.g., $cat^1$, $cat^2$, $cat^3 \ldots$) to the "general" ("cat").

How fast this step is taken depends (as we will see in the next section) on the parameters of the system. By altering these parameters, it is possible to construct mappings which vary from those which retain all particular to which they are exposed, to those which lose the particulars and retain only common elements — the central vector of any class.

In addition to "errors" of recognition, the associative memory also makes errors of association. If, for example, all (or many) of the vectors of the class $\{s^a$ with a reasonably large community associate some particular $r^\beta$ so that the mapping A contains terms of the form

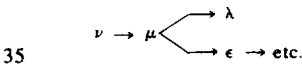

with $c_{\beta\nu} \neq 0$ over much of $\nu = 1, 2 \ldots k$, then the new event $e^{k+1}$ which maps into $s^{k+1}$ as in the previous example will not only be recognized $$(R s^{k+1}, R\ s^{k+1})$$

large but will also associate $r^\beta$ $$A\ s^{k+1} = c\ r^\beta + \ldots$$

as strongly as any of the vector in $\{s^\alpha\}$.

If errors of recognition lead to the process described in language as going from particulars to the general, errors of association might be described as going from particulars to a "universal": $cat^1$ meows, $cat^2$ meows ... → all cats meow.

There is, of course, no "justification" for this process. It is performed as a consequence of the nature of the system. Whatever efficacy it has will depend on the order of the world in which the system finds itself.

Figure 7:
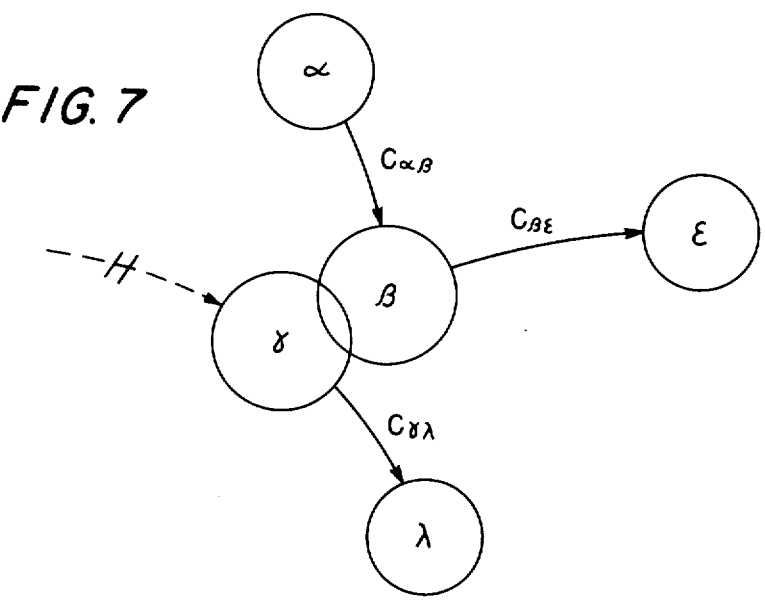
FIG. 7 is a representational diagram illustrating a particular principle of operation in a Nestor module according to the present invention.

By a sequence of mappings of the form above (or by feeding the output of A back to itself) one obtains a fabric of events and connections $$\nu \rightarrow \mu \begin{cases} \rightarrow \lambda \\ \rightarrow \epsilon \rightarrow etc. \end{cases}$$

which is rich as well as suggestive. One easily sees the possiblity of a flow of electrical activity influenced both by internal mappings of the form A and the external input. This flow is governed not only by direct association coefficients $c_{\mu\nu}$ (which can be explicitly learned as described next) but also by indirect associations due to the overlapping of the mapped events as indicated in FIG. 7. In addition, one can easily imagine situations arising in which direct access to an event, or a class of events, has been lost ($c\gamma\gamma = 0$ in FIG. 7) while the existence of this event or class of events in A influences the flow of electrical activity.

4. Separation of Vectors: Any state in a distributed memory is generally a superposition of various vectors. Thus one has to find a means by which events (or the entities into which they are mapped) are distinguished from one another.

There are various possibilities: It is not all difficult to imagine non-linear or threshold devices that would separate one vector from another. But the occurrence of a vector in the class $\{s^\alpha\}$ in a distributed memory results in a set of output responses over a large number of outputs $r_i$, each of which is far from threshold. A basic problem, therefore, is how to associate the threshold of a single response with such a distributed signal. How this might be done will be described in a later section.

In addition to the appearance of such threshold outputs, there can be a certain separation of mapped signals due to actual localization of the areas in which these signals occur. For example, optical and auditory signals could be subjected to much processing before they actually meet in one Nestor module. It is possible too permit the identification of optical or auditory signals (as optical or auditory) to take place first; connections between an optical and an auditory event might then occur subsequently in a second level of processing, from the response bank R to a second response bank H, as suggested in FIG. 8.

C. Module Modification, Learning

The $ij^{th}$ element of the associative mapping A $$A_{ij} = \sum_{\mu\nu} c_{\mu\nu} \; r_i^\mu \; s_j^\nu \qquad (1)$$

is a weighted sum over the $j$ components of all mapped signals, $s^\nu$, and the $i$ components of the responses, $r^\mu$, appropriate for recollection or association.

Such a mapping may, of course, be attained by adjusting the weight of each mnemonder so that its value is equal to the corresponding $A_{ij}$ above. This is the simplest mode in which the Nestor module can function.

A most important characteristic or the Nestor module is its self-modification capacity. When functioning in a learning mode the Nestor module modifies the weights of its mnemonders so that (apart from a uniform decay described later)

$$\delta A_{ij} \sim r_i\, s_j \qquad 2$$

This $\delta A_{ij}$ is proportional to the product of the input $s_j$ and the output $r_i$. Alterations in junction strenghts proportional only to $s_j$ or to the immediate junction response $s_j{}'$ are also possible; however, such modifications do not result in the various properties discussed here. The addition of such changes in A indicated by the proportionality (2), above, for all associations $r^\mu \times s^\nu$ results, also, in a mapping with the properties discussed in the previous section.

To make the modifications to $A_{ij}$ $$\delta A \sim r^\mu \times s^\nu \qquad 3$$

by the self-modification procedure of the Nestor module the system should have the signal distribution $s^\nu$ in its S bank and $r^\mu$ in its R bank, where $s^\nu$ is mapped in from the event $e^\nu$ by P.

In what we denote as "active learning" the Nestor module may be presented with an input $s^\lambda$ and be forced to produce the "correct" response, say $r^\omega$. This can be done, for example, with apparatus of the type illustrated in FIG. 9 in which the desired response values $r_{1A}, r_{2A} \ldots, r_{iA} \ldots, r_{NA}$ may be applied to the outputs $1, 2, \ldots j \ldots N$ to constrain the output signals $r_1, r_2 \ldots r_i \ldots r_N$ to equal these desired values. Since the output signals are utilized in the Nestor module in the modification of the elements $A_{ij}$ according to proportionality (2) above; i.e., according to $$\delta A_{ij} = \eta r_i^\omega \; s_j^\lambda$$

(where $\eta$ is the constant of proportionality), upon repeated application of the input $s^\lambda$, the module very rapidly builds up a detailed and accurate memory of the output response $r^\omega$ to the input $s^\lambda$.

Active learning also describes a type of learning in which a system response to a set of inputs is matched against an expected or desired response and judged correct or incorrect. In this case, if the system is presented with some input $s^\lambda$, its output response $r^\mu$ thereto may be compared to the "right" response $r^\omega$ and the elements $A_{ij}$ caused to be incremented in a direction which would result in a response that is closer to $r^\omega$ if $s^\lambda$ were applied again.

It is apparent that with active learning the human operator of the system is required to know the appropriate response $r$ to the various inputs $s$. However, the Nestor module is capable of another mode of operation, which we will call "passive learning", that does not require human intervention. In particular, the Nestor module is capable of identifying, recognizing, recalling, generalizing, or associating features of the environment to which it is exposed even though no previous analysis or identification of the features in the external environment has been made. In this type of learning, the human operator need not even be aware of the relevant features in the environment which are being extracted and processed in the Nestor module.

To arrive at an algorithm which produces passive learning, we utilize a distinction between forming an internal representation of events in the external world as opposed to producing a response to these events which is matched against what is expected or desired in the external world.

The simple but important idea is that the internal electrical activity which in one module signals the presence of an external event is not necessarily the same electrical activity which signals the presence of that same event for another module. There is nothing that requires that the same external event be mapped into the same signal distributions by different modules. The event $e^\nu$, which for one module is mapped into the signal distributions $r^\nu$ and $s^\nu$, in another module may be mapped into $r'^\nu$ and $s'^\nu$. What is required for eventual agreement between modules in their description of the external world is not that the mapped electrical signals be identical but rather that the relation of the signals to each other and to events in the external world be the same. Figure 10 illustrates this principle in graphic form:

1. Passive Learning: Call $A^{(t)}$ the A matrix (that is, the set of $A_{ij}$'s) after the presentation of $t$ events ("time" $t$). We write:

$$A^{(t)} = \gamma A^{(t-1)} + \delta A^{(t)}$$

where $$\delta A^{(t)} = \eta\, r^t \times s^t .$$

In this equation, as mentioned above, $\eta$ is the constant of proportionality and $\gamma$ is a dimensionless "decay constant" which is a measure of the uniform decay of information at every site (a type of forgetting). Usually, $0 \leq \gamma \leq 1$.

We also now introduce the parameter $\epsilon$, defined as the value of $\eta$ when the inputs $s^t$ are normalized. $\epsilon$, which is a measure of the rate at which modifications are made to the A's (a rate of learning) will be used in illustrative calculations made for normalized inputs $s^t$. The values of the parameters $\gamma$, $\eta$ and $\epsilon$ can be adjusted at the discretion of the user to produce the desired system properties. For example, during the period of acquisition of information (learning, or program writing), $\eta$ or $\epsilon$ might be reasonably larger than zero (e.g., $\eta \approx \epsilon \approx 1/10$) and $\gamma$ might be reasonably smaller than one (e.g., $\gamma \approx 9/10$) so that the system will acquire information and lose details. After the period of acquisition, it may be useful to set $\eta = \epsilon = 0$ and $\gamma \approx 1$ so that the system will no longer "learn" but will retain for an arbitrary period of time all the information it has acquired. In a functioning module this storage time is determined by time constants characteristics of the circuits. For reasons of economy or convenience these may be chosen to allow storage for periods of the order of minutes to hours. For longer storage, under such circumstances, one could transfer the contents of the distributed memory (for example, the values of the $A_{ij}$) to a buffer memory for transfer back when needed.

In general, a system in which $\gamma < 1$ loses details and has a greater capacity to generalize. It turns out that values of $\gamma$ slightly less than or equal to 1 are of the most interest.

In order to keep the system from becoming saturated, it is also convenient to make the modification zero (let $\eta = 0$) when the output, $r = As$, exceeds a specified maximum; i.e.: $(r, r) = (As, As) \geq$ specified maximum.

In what follows we normalize all vectors $(s, s) = 1$ so that $\epsilon$, which is now taken to be constant, becomes dimensionless.

If we now say that $r^t$ is $$r^t = \gamma A^{(t-1)} s^t + r_R{}^t + r_A{}^t,$$

we see that the total response is composed of three terms: a passive response, $\gamma A^{(t-1)} s^t$, an active but random term $r_R{}^t$, and an active response, $r_A{}^t$. For purely passive learning we consider only the first term so that $$\delta A(t) = \epsilon\, r^t \times s^t = \epsilon \gamma A^{(t-1)}\, s^t \times s^t.$$

Here the responses are just those produced by the existing mapping, $A^{(t-1)}$, when the vector $s^t$ in S is mapped into R:

$$r^t = \gamma A^{(t-1)} s^t.$$

The passive learning algorithm is then $$A^{(t)} = A^{(t-1)} (\gamma + \gamma s^t \times s^t)$$
$$= \gamma A^{(t-1)} (1 + \epsilon s^t \times s^t),$$

where in general $\epsilon$ would usually be much smaller than 1. Before any external events have been presented, A has the form $A^{(0)}$ which could be random. The effect of $A^{(0)}$ on the internal mapping will be analyzed below.

With this algorithm, after k events A has the form:

$$A^{(k)} = \gamma^k A^{(0)} \prod_{\nu=1}^{k} (1 + \epsilon s^\nu \times s^\nu),$$

where $\pi_0$ is an ordered product in which the factors with lower indices stand to the left:

$$\prod_{\nu=1}^{k} s(\nu) = s(1) s(2) \ldots s(k).$$

This can also be written:

$$A^{(k)} = \gamma^k A^{(0)} [1 + \epsilon \sum_{\nu=1}^{k} s^\nu \times s^\nu + \epsilon^2 \sum_{\nu<\mu} s^\nu \times s^\mu (s^\nu, s^\mu)$$

$$+ \ldots + \epsilon^k s^1 \times s^k (s^1, s^2)(s^2, s^3)(s^3, s^4) \ldots (s^{k-1}, s^k)].$$

The passive learning algorithm generates its own response $A^{(0)} s^\nu$ to the incoming vector $s^\nu$, a response that depends on the original configuration of the network through $A^{(0)}$ and on the vector $s^\nu$ mapped from the event $e^\nu$. For example, if $s^\nu$ is the only vector presented, A eventually takes the form $$A \upsilon\, r^\nu \times s^\nu$$

where $$r^\nu = A^{(0)} s^\nu.$$

2. Special Cases of A: We now display the form of A in several special cases; in all of these $\epsilon$ is assumed to be constant and small.

a. If the k vectors are orthogonal, A becomes $$A^{(k)} = \gamma^k (A^{(0)} + \epsilon A^{(0)} \sum_{\nu=1}^{k} s^\nu \times s^\nu ).$$

Letting $A^{(0)} s^\nu = r^\nu$, the second term takes the form of the "diagonal" part of A $$(A)_{diagonal} = R = \sum_{\nu=1}^{k} r^\nu \times s^\nu$$

and will serve for the recognition of the vectors $s^1 \ldots s^k$. (It should be observed that the associated vectors $r^\nu$ are not given in advance; they are generated by the network.) If $\epsilon$ is small, however, this might be inadequate for recognition since the recognition term would be weak. Further, it will usually be more useful if recognition is set to occur only after repeated exposure to the same event.

b. The following example demonstrates that the passive learning algorithm does build up recognition coefficients at an exponential rate for repeated inputs of the same event. If the same vector $s^o$ is presented $l$ times, A becomes eventually $$A^{(l)} \sim \gamma^l A^{(0)} (1 + e^{l\epsilon}\, s^o \times s^o).$$

If $l$ is large enough so that $e^{l\epsilon} \gg 1$, the recognition term will eventually dominate. When $e^{l\epsilon}$ becomes large enough it may be desirable to adjust the value of $\epsilon$ so that there is no further growth. This can be accomplished by making $\epsilon$ a function of the response to the incoming vector so that beyond some maximum value there is no further increase of the coefficient.

c. The presentation of m orthogonal vectors $l_1, l_2 \ldots l_m$ times results in a simple generalization of the second result. When $\gamma = 1$ for simplicity:

$$A^{(l_1+l_2+\cdots+l_m)} = A^{(0)} (1 + \sum_{\nu=1}^{m} e^{l_\nu \epsilon} s^\nu \times s^\nu )$$

which is just a separated associative recognition and recall matrix $$A = \sum_{\nu=1}^{m} c_{\nu\nu} \; r^\nu \times s^\nu$$

if $$e^{l\nu\epsilon} = c_{\nu\nu} \gg 1.$$

d. Some of the effect of non-orthogonality can be displayed by calculating the result of an input consisting of $l$ noisy vectors distributed randomly around a central $s^o$ $$s^\nu = s^o + n^\nu$$

Here $n^\nu$ is a "stochastic vector" (i.e., a vector that varies randomly) whose magnitude is small compared to that of $s^o$.

We obtain $$A^{(l)} \approx \gamma^l A^{(0)} e^{l\epsilon} \; n^{2l/N} (1 + e^{l\epsilon} \; s^o \times s^o)$$

where $n$ is the average magnitude of $n^\nu$. We see that the generated $A^{(l)}$, with the additional factor due to the noise, is just of the form for recognition of $s^o$. Thus the repeated application of a noisy vector of the form above results in an A which recognizes the central vector $s^o$. This again provides a means of separating signal from noise.

3. Structure of the Mapped Space: The communities or separated classes of the signal or external spaces, E or S, will be the same as those of the mapped space, R, if $$(r^\alpha, r^\beta) = (s^\alpha, s^\beta)$$

where $$r^\alpha = A^{(0)} s^\alpha.$$

This will be the case if $A^{(0)}$ satisfies the relation $$(A^{(0)})^T A^{(0)} = I \text{ (the identity matrix)} \quad 4$$

or $$\sum_{i=1}^{N} A_{ij}^{(0)} A_{ik}^{(0)} = \delta_{jk},$$

where $$\epsilon_{jk} = 1 \; j = k$$
$$= 0 \; j \neq k,$$

for then it follows that $$(r^\alpha, r^\beta) = (A^{(0)} s^\alpha, A^{(0)} s^\beta) = (s^\alpha, s^\beta).$$

This can easily be arranged. If, for example, we choose $$A^{(0)} = I,$$

then (4) is satisfied and the S space maps into itself:

$$r^\alpha = s^\beta.$$

It is interesting to note that even a random $A^{(0)}$ will on the average satisfy the requirement (4). Suppose that $A^{(0)}$ is a random symmetric matrix and satisfies the conditions $$\sum_{i=1}^{N} A_{ij}^{(0)} \approx 0$$

for all $j$, $$\sum_{i=1}^{N} (A_{ij}^{(0)})^2 \approx 1$$

then $$\sum_{i=1}^{N} A_{ij}^{(0)} A_{ik}^{(0)} \approx 0$$

$$j \neq k$$

while $$\sum_{i=1}^{N} A_{ij}^{(0)} A_{ij}^{(0)} = \sum_{i=1}^{N} (A_{ij}^{(0)})^2 \approx 1$$

$$j = k.$$

Thus the condition (4) is satisfied; therefore a random $A^{(0)}$, as above, will lead to a mapped space with the same communities and classes as the original signal space.

4. Association Terms: Off-diagonal or associative terms can be generated as follows. Assume that A has attained the form $$A = \sum_{\nu=1}^{k} A^{(0)} s^\nu \times s^\nu = \sum_{\nu=1}^{k} r^\nu \times s^\nu.$$

Now present the events $e^\alpha$ and $e^\beta$ so that they are "associated", so that the vectors $s^\alpha$ and $s^\beta$ occur or "map" together. (The precise conditions which result in such a simultaneous mapping of $s^\alpha$ and $s^\beta$ will depend on the construction of the system. The simplest situation to imagine is that in which the vector $(s^\alpha + s^\beta)$ is mapped if $e^\alpha$ and $e^\beta$ are presented to the system close enough to each other in time.) We may assume that $e^\alpha$ and $e^\beta$ are separated so that $(s^\alpha, s^\beta) = 0$. In the S bank, if the vector is normalized for convenience, we then have $1/\sqrt{2}(s^\alpha + s^\beta)$.

After one such presentation of $e^\alpha$ and $e^\beta$, A becomes (again for simplicity setting $\gamma = 1$):

$$A^{(1)} \approx \sum_{\nu=1}^{k} r^\nu \times s^\nu + \epsilon/2 (r^\beta \times s^\alpha + r^\alpha \times s^\beta).$$

The second term gives the association between $\alpha$ and $\beta$ with the coefficient $$c_{\alpha\beta} = c_{\beta\alpha} = \epsilon/2$$

which generally (except in special circumstances) would be most useful if small. If $s^\alpha$ and $s^\beta$ do not occur again in association, $c_{\alpha\beta}$ or $c_{\beta\alpha}$ (although they do grow upon the presentation of $s^\alpha$ or $s^\beta$ separately) remain small compared to the respective recognition coefficients $c_{\beta\beta}$ or $c_{\alpha\alpha}$. However, if $$\frac{1}{\sqrt{2}}(s^\alpha + s^\beta)$$

is a frequent occurence (appearing for example $l$ times), the coefficient of the cross term becomes $$c_{\alpha\beta} \approx e^l / 2$$

and becomes as large as the recognition coefficient.

With the previous results we have established that the signal and response spaces, along with the mapping that connects them, contain a structure that is analogous to the original structure in the external environment or the event space, E. This means the following:

1. The classes or the communities of the response space, R, are the same as these of the external or signal spaces, E and S.
2. Classes or events which are associated in the external space (those which occur in association during a learning period) become associated in the response space so that, after the learning period, the occurrence of one member of the associated classes or events in the external space E, and therefore in the signal space S, will map both members of the associated classes or events in the response space R, even though they are very different types of events.

5. Separation of Events — Threshold Devices: We have dealt above with linear mappings and spaces. As a consequence, a state is in general a superposition of several vectors. To distinguish the events —or the signals into which they are mapped —from one another we can incorporate a threshold or other non-linear device into the system. There can also be a separation of mapped signals due to localization of the areas in which these signals occur. For example, as illustrated in FIG. 8, optical and auditory signals can be subjected to processing in separate modules before they actually meet in a common module. Thus the identification of optical or auditory signals would occur first from the module into which they are initially mapped. Associations between an optical and an auditory event would then arise in the common module.

Figure 11:
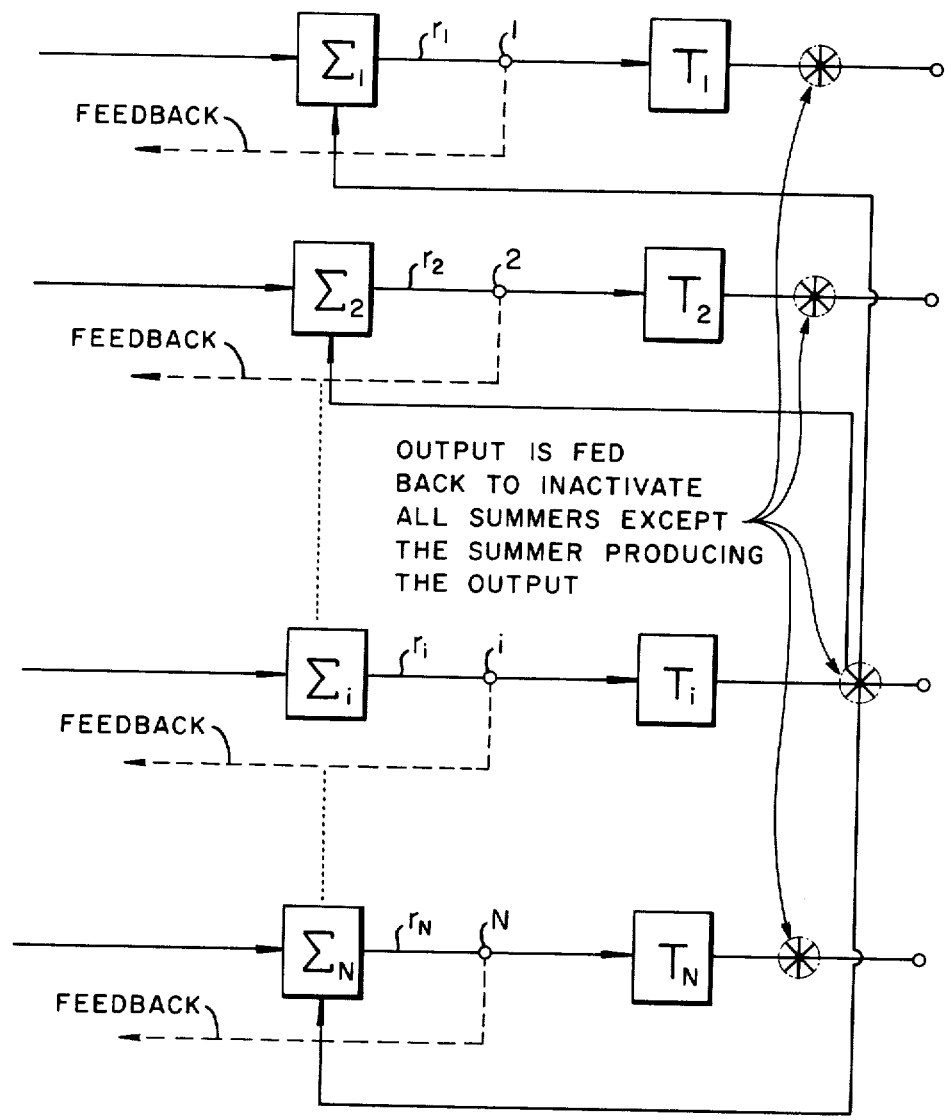
FIG. 11 is a block diagram showing apparatus which may be employed with a Nestor module according to the present invention to achieve a specific type of output response.

An example of a threshold device is described below. Since a signal in a distributed memory is spread over a large number of inputs or outputs, even a large signal, $[(s^\alpha, s^\alpha)$ large] might be composed of components, $s_i^\alpha$, each of which is quite small. A basic problem, therefore, is how to associate the threshold of a single device with such a distributed signal. This can be accomplished by adding threshold devices $T_1, T_2 \ldots, T_N$ to the basic module as illustrated in FIG. 11. For example, the threshold device $T_i$ gives an output if the absolute value of its input $|r_i|$ exceeds some predetermined value $$|r_i| > \theta_i,$$

where $\theta_i$ is the signal threshold of the device. It is important to note that the original input $s^\alpha$ could either be an original input from E or the output of a previous module.

A repeated input of the pattern $s^\alpha$ maps into the output pattern $r^\alpha$ which, by a repetition of the argument given above, grows exponentially. As a result an arbitrary but repeated input, $s^\alpha$, will eventually activate a threshold device which will respond to that input. It is important to note that:

a. The input need not be known beforehand;
b. The input might be submerged in random noise; and
c. Which threshold device responds to the pattern $s^\alpha$ also need not be known in advance. (With the algorithm above, the largest component of the response $r^\alpha$ determines which device responds.) By a simple variation, a particular threshold device could be designed to respond to a particular pattern.

With the addition of lateral connections as indicated in FIG. 11, the firing of a single threshold device in response to the pattern $s^\alpha$ would then suppress the response of the other threshold devices to this pattern. If the parameter $\gamma < 1$ during the period of acquisition, and $s^\alpha \rightarrow T_i$, then the response to $s^\alpha$ would be modified due to the combined action of the decay ($\gamma < 1$) and the lateral suppression so that only the $i^{th}$ component of the response $r^\alpha$ to the input $s^\alpha$ would remain substantially larger than zero. In a final state we would have $$s^\alpha \rightarrow r_i \rightarrow T_i \rightarrow \text{output signal}.$$

Thus, a single (or as many as desired) threshold devices could respond to a single pattern.

In addition it is useful not to modify further (allowing, however, the decay) the mnemonders associated with the $i^{th}$ threshold element ($1i, 2i \ldots Ni$) when this $^{th}$ element produces an output signal in excess of a specified maximum. This may be accomplished by ending the modifications in the above-mentioned mnemonders for some fixed number of events every time the said output exceeds the specified maximum.

If such a system is presented with separated or orthogonal signals during a learning period, the threshold devices will, with the exponential rapidity described previously, come to be activated by the different patterns.

Thus, for example, N orthogonal repeated incoming signals would, after the learning period, produce a response in N different threshold devices.

In this way the threshold devices could learn to respond to repeated features in the environment even though these were not known to the user.

In addition, the association of these devices with output patterns of a prior module would serve for the separation of events or vectors mentioned above.

In conclusion, from the theoretical explanation of the present invention set forth above, it will be appreciated that the Nestor module is an extremely powerful tool for processing information. In particular, this module is capable of exhibiting recognition, recollection, generalization and association, defined earlier, without the necessity for human intervention in any decisional or learning process. A specific preferred embodiment of the Nestor module will now be described which utilizes only conventional circuit elements and which lends itself to realization with known techniques of microminiaturization.

II. A SPECIFIC REPRESENTATIVE EMBODIMENT

It will be appreciated, from the structural and theoretical explanation of the present invention set forth above, that the invention may be realized in a number of ways. The following is a description of what is at present a preferred embodiment of apparatus for realizing the present invention, which apparatus utilizes only standard electrical components such as resistors, capacitors, diodes and transistors. It will be understood, however, that this preferred embodiment is described for purposes of explanation only, and is not intended to limit the scope of the invention.

It will be recalled that the $i^{th}$ nouveron (FIG. 2) of a Nestor module comprises N inputs $s_1, s_2 \ldots, s_N$ leading to N mnemonders $i1, i2 \ldots, iN$ connected to a summer $\Sigma_i$ which produces an output $r_i$. The $ij^{th}$ mnemonder has a transfer function $A_{ij}$; that is, the output of this mnemonder is $s_j' = A_{ij} s_j$, where $s_j$ is $j^{th}$ input to the Nestor module.

In the preferred embodiment to be described, it will be assumed that the information signals $s_j, s_j'$ and $r_i$ are, in all cases, represented by voltage levels. Again, at the risk of appearing repetitious, it will be understood that the information signals may also be represented by variations in some other aspect of real world electrical signals. For example, the information signals may be represented by frequencies (pulse repetition frequencies or sinusoidal frequencies), by pulse widths, by currents, by magnetic fields, by magnetizations or even a combination of these.

However, assuming that the information signals are to be represented by voltages, the transfer function $A_{ij}$ may be viewed as "amplification" (sometimes amplification, sometimes diminuation, sometimes change of sign) and, in particular, "amplification" which is to be modified in dependence upon the input $s_j$ to the mnemondor and the output $r_i$ of the $i^{th}$ nouveron. In one preferred algorithm, the modification function is described by the following equation:

$$\delta A_{ij} = \eta\, r_i\, s_j. \qquad 5$$

In order to realize an amplifier, the gain of which is controlled by increments to some previous gain, it is necessary to provide a means to store information of the previous gain and a means for adding and/or subtracting increments to or from this stored value. The storage function in the preferred embodiment of the invention is realized by an element, such as a capacitor, for storing an electrical charge Q; the incrementing function in this embodiment is therefore realized by apparatus for varying the charge Q from zero to $+Q_o$ or $-Q_o$, the limits of the storage element.

Figure 12:
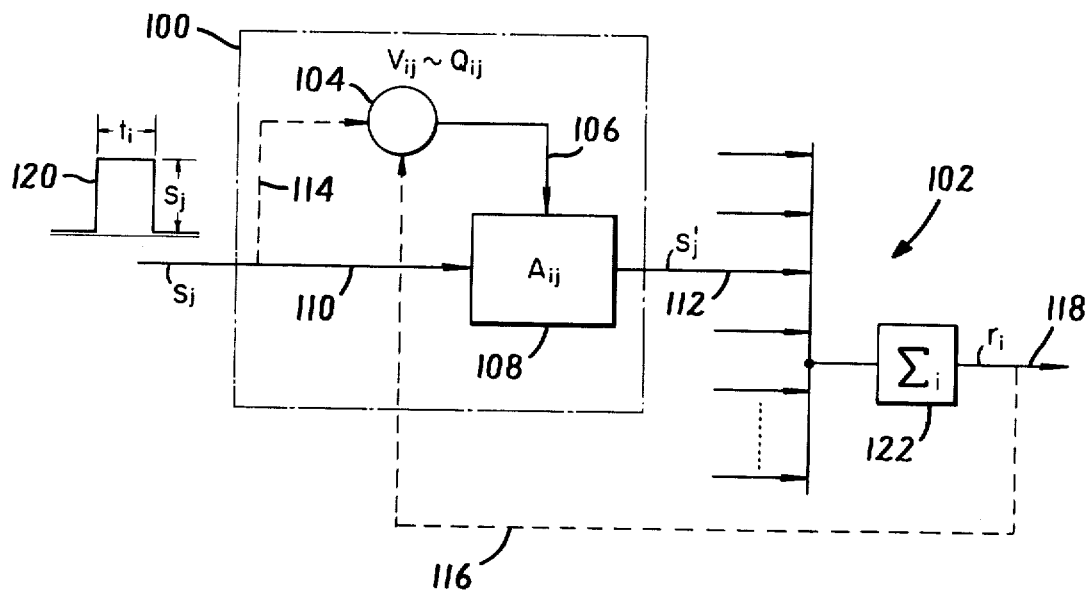
FIG. 12 is a block diagram illustrating a portion of a nouveron network incorporating a charge storage mnemonder according to a preferred embodiment of the present invention.

Referring now to FIG. 12, there is shown the $ij^{th}$ mnemonder 100 of the $i^{th}$ nouveron 102. A voltage source 104 applies a voltage $V_{ij}$ via line 106 to an amplifier 108 to control its gain $A_{ij}$. The amplifier 108 therefore changes the voltage signal $s_j$ appearing on line 110 and produces an output voltage $s_j' = A_{ij} s_j$ on line 112.

The voltage $V_{ij}$, which regulates the gain, is derived from and is therefore proportional to $Q_{ij}$, the charge stored in the $ij^{th}$ mnemonder. The dashed lines 114 and 116 indicate, respectively, that this charge can be varied (increased or decreased) in dependence upon the input signal $s_j$ appearing on line 110 and the output response $r_i$ appearing on line 118. (Line 116 is shown as going to the source 104 to convey symbolically the idea of modification by $r_i$; in the present embodiment the feedback $r_i$ is actually directed to a device which modifies the width of the input pulses of heights $s_1, s_2 \ldots, s_N$. See FIG. 14 and the description thereof.)

To modify $Q_{ij}$, and therefore $V_{ij}$ and $A_{ij} = s_j'/s_j$ in accordance with the equation (5), above, it is necessary to change the stored charge $Q_{ij}$ by the product $r_i s_j$. [Note that the N charges of the $i^{th}$ nouveron (namely, $Q_{i1}, Q_{i2} \ldots, Q_{ij} \ldots, Q_{iN}$) must be modified in proportion to the respective inputs they receive (namely, $s_1, s_2 \ldots, s_j \ldots, s_N$) and the common output $r_i$ of the nouveron.] To achieve the desired modification, we use as a signal $s_j$ the height of a voltage pulse 120, while the width $t_i$ of this pulse is made proportional to $|r_i|$. If $r_i < 0$, the voltage pulse 120 is inverted. Thus:

$$\epsilon Q_{ij} \sim s_j t_i,$$

$$t_i \sim |r_i|$$

$$\frac{r_i}{|r_i|} = \begin{matrix} +1 \rightarrow \text{no inversion} \\ -1 \rightarrow \text{inversion} \end{matrix}$$

Figure 13:
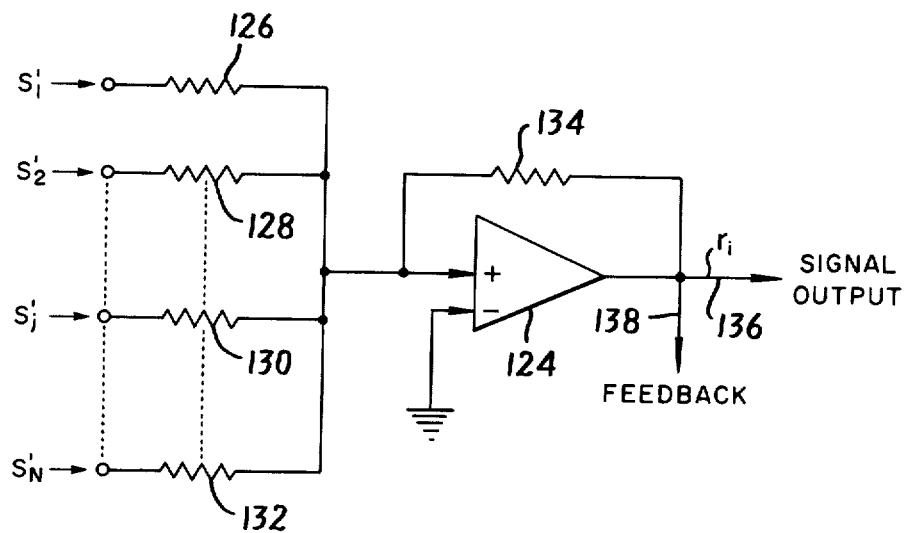
FIG. 13 is a schematic diagram of a summation circuit which may be employed in the nouveron network of FIG. 12.
Figure 14:
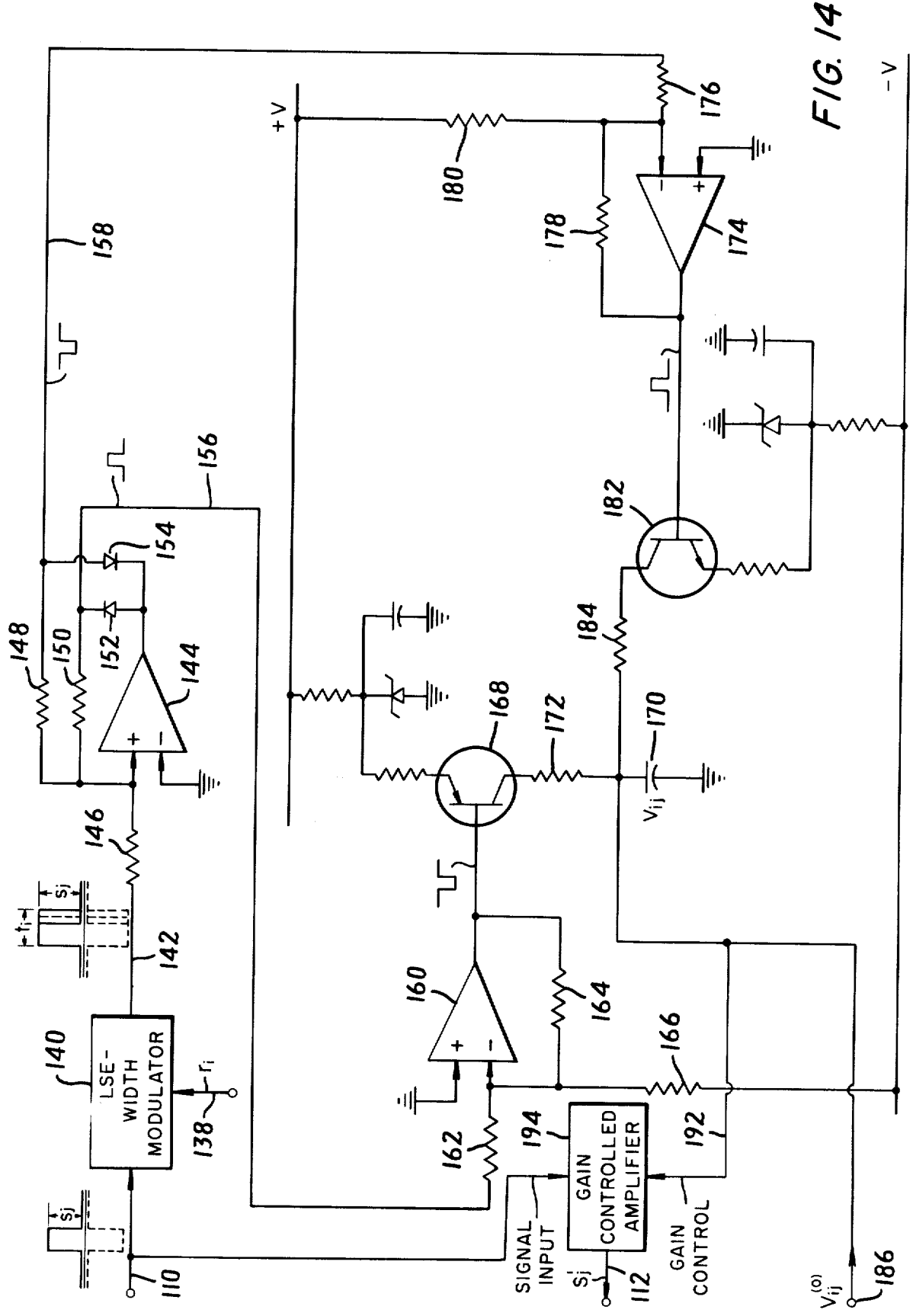
FIG. 14 is a schematic diagram of a mnemonder which may be employed in the nouveron network of FIG. 12.

Specific circuits for the summing aspect of nouveron 102 and the mnemonder 100 are shown schematically in FIGS. 13 and 14. The summer 122 of the nouveron 102 is represented in FIG. 13 as a classic summation circuit employing an operational amplifier 124 connected to receive input signals $s_1', s_2' \ldots, s_j' \ldots, s_N'$ via a plurality of equally valued resistors 126, 128 ... , 130 ... , 132, respectively. The operational amplifier is provided with a resistor 134, in a known manner, and provides an output signal $r_i$ on line 136 that is proportional to the sum of the various signals $s_1', s_2' \ldots, s_j' \ldots, s_N'$ which are the outputs of the individual mnemonders of the nouveron 102. The output signal $r_i$ is supplied via a feedback line 138 to each mnemonder of the nouveron.

The $ij^{th}$ mnemonder shown in FIG. 14 receives the input signal on line 110 and produces its output signal $s_j'$ on line 112. The $j^{th}$ input is in the form of a pulse of amplitude $s_j$ (which may be either positive or negative) and a standard pulse width determined by the input processor or buffer that connects the mnemonder, nouveron and Nestor module to the outside world (environment). As stated above, the input and output devices employed with the Nestor module form no part of the present invention and are consequently not described herein in detail. The construction of the input processor will depend, of course, upon the type of events which are to be mapped into the Nestor module, while the output processor will be constructed in accordance with the ultimate objectives of the system; that is, the action to be taken in response to the outputs of the Nestor module.

Suffice it to say, for the purposes of this discussion, that the input processor supplies a plurality of input pulses to the input terminals $1, 2 \ldots, j \ldots, N$ of the Nestor module. The input pulses, which are supplied simultaneously for each event, all have a standard width, say several $\mu$sec., and have amplitudes proportional to the variables $s_1, s_2 \ldots, s_j \ldots, s_N$, respectively, which are to be processed. The pulse amplitudes can be negative to reflect negative values of the signals $s_1, s_2 \ldots, s_j \ldots, s_N$.

Referring again to FIG. 14, the input pulse of amplitude $s_j$ is applied to a pulse width modulator 140 which simultaneously receives a signal $r_i$ on line 138 that is taken from the output of the summer $\Sigma_i$ (i.e., the apparatus illustrated in FIG. 13). The signal $r_i$ results from the summation performed by the summer $\Sigma_i$ on the signals $s'_j$ put out by the mnemonders.

The pulse width modulator transmits a pulse on line 142 having the same absolute amplitude as the input pulse on line 110, (but inverted if $r_i < 0$) and having a pulse width $t_i$ proportional to the variable $|r_i|$.

The positive and negative pulses appearing on line 142 are amplified and separated according to polarity (sign) by means of an operational amplifier 144 and its associated resistors 146, 148 and 150 and diodes 152 and 154. If a pulse appearing on line 142 is positive, it is channeled to a line 156 as a positive pulse; if negative, it is channeled to a line 158 as a negative pulse. Whether positive or negative, it will be appreciated that the area under the pulse (as viewed graphically) is porportional to the absolute magnitude of the product of $s_j$ and $r_i$.

The positive pulses on line 156 are applied to an inverting operational amplifier 160, which includes resistors 162, 164 and 166, and ultimately to the base of a PNP transistor 168. The pulses arriving at the base of the transistor 168 thus have the appropriate polarity (sign) to activate the transistor, and to charge or discharge a capacitor 170 through a resistor 172. The amount of charge deposited on or removed from the capacitor 170 by each positive pulse is proportional to the product of the amplitude of the pulse, which determines the effective conductance of the transistor 168, and the pulse width, which determines the duration of the charging or discharging operation.

The negative pulses on line 158 are supplied to an inverting operational amplifier 174, with its resistors 176, 178 and 180. In a manner anologous to that described for the PNP transistor 178, an NPN transistor 182 is thereby activated by the inverted negative (i.e. positive) pulses applied to the NPN transistor base. The capacitor 170 is consequently discharged or charged through a resistor 184. The amount of charge removed from or added to the capacitor 170 by each negative pulse is proportional to the product of the amplitude of the pulse, which determines the effective conductance of the transistor 182, and the pulse width, which determines the duration of the discharging or charging operation.

As a result of the operation described above, the charge across the capacitor 170, $Q_{ij}$ and, in turn, the voltage $V_{ij}$, is the result of an initial charge state, which may be applied at an input terminal 186 before the mnemonder is placed into operation, and the sum total of all the increments and decrements which occur as the result of the repeated application of pulses to the input line 110. It should be appreciated that the capacitor 170 can be charged with either polarity, as well as change polarity, within the limits of the positive and negative voltage capabilities of the power supply.

In order to permit the mnemonder to "forget" the stored information over a period of time, the voltage $V_{ij}$ may be allowed to decay at an appropriate rate. This decay rate is related to the decay constant $\gamma$ discussed above in the theoretical explanation of the invention, where an infinite decay time (open circuit) is equivalent to $\gamma = 1$ and a zero decay time (short circuit) equivalent to $\gamma = 0$. As mentioned, values of $\gamma$ close to 1 are of greatest interest in practice, so that the decay time constant should be made quite large. To this end, appropriate values of the capacity of capacitor 170 and resistance or impedance for all the elements are selected to yield the desired time constants.

Finally, the voltage $V_{ij}$ across the capacitor 170 is applied via a line 192 to the control input of a gain controlled amplifier 194. If necessary, an amplification stage may be inserted between the capacitor 170 and the gain controlled amplifier 194. Here again an appropriately high input impedance of this amplifier is selected to obtain the desired decay constant $\gamma$. The amplifier 194 also receives the pulses of amplitude $s_j$ from the line 110 and "amplifies" (again "amplification" includes amplification, diminuation and changes of polarity) these pulses, in accordance with the controlled level of gain, to produce output pulses of amplitude $s_j'$ on line 112.

Figure 15:
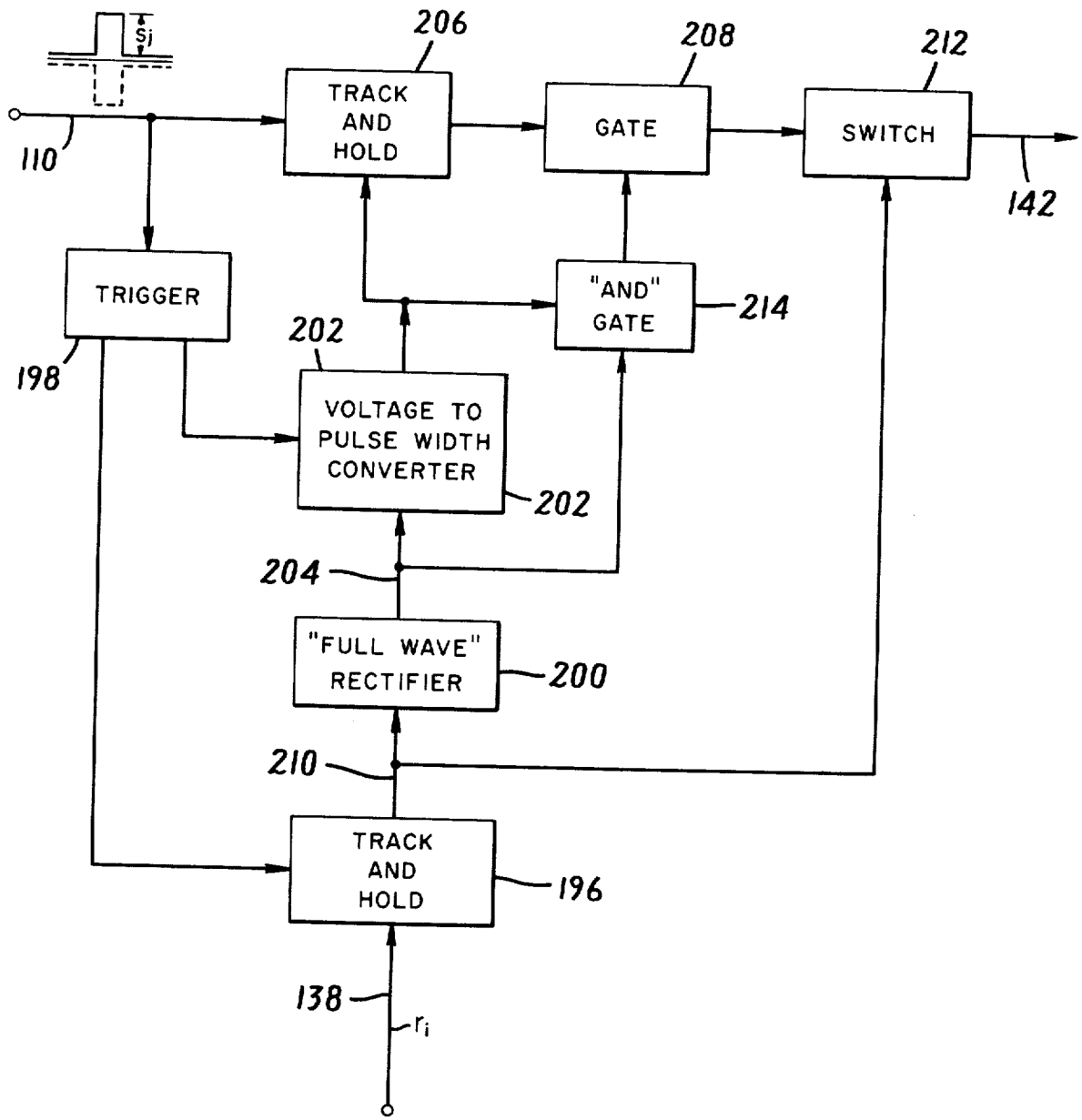
FIG. 15 is a block diagram of apparatus, which may be employed with the nouveron network of FIG. 12, for processing network input signals by means of the network output.

The processing of the inputs $s_j$ by means of the summed outputs $r_i$ is now considered in some detail with reference to FIG. 15. It is noted first that $r_i$ may be positive, negative, or zero, and that in the absence of porvisions to the contrary, $r_i$ as obtained at the output of the summer 122 of FIG. 12 is in the form of pulses. While this form may be satisfactory for purposes of the processors to be attached to line 136 of FIG. 13, the feedback operation is more conveniently accomplished in the present embodiment by means of a quasi-continuous form of $r_i$. To this end the feedback indicated on line 138 in FIGS. 13 and 14 is connected to a "track-and-hold" device 196 in FIG. 15. The purpose of this device is to extend the duration of each pulse of $r_i$ for a period approximately equal to the time separation between consecutive pulses, without changing the pulse amplitude. As shown schematically in FIG. 15 the "track-and-hold" device 196 is triggered by the inputs (pulsed $s_j$) through the trigger 198. (The trigger 198 may include provisions for signal amplification, shaping, etc., as will be apparent to those skilled in the art). The pulsed output $r_i$ is thus converted to an essentially continuous signal of time varying amplitude, herein after called $r_i'$. This signal $r_i'$ is in turn fed into a "full wave" rectifier 200 and then into a "voltage-to-pulse width" converter 202. Thus the quasi-continuous signal to the converter 202, at location 204, is positive (or zero). The converter 202, when triggered by the trigger 198, as indicated in FIG. 15, produces pulses of a standard height and width, the width being small compared to that of the pulsed inputs $s_j$. The function of the signal $r_i'$ is to broaden these narrow pulses (produced by 202) in proportion to the amplitude of $r_i'$. The pulses (of constant amplitude) produced by the converter 202 are fed to another "track-and-hold" device 206 and to a gate 208, as shown in FIG. 15. The incoming signals $s_j$, initially of a standard pulse width, enter first the "track-and-hold" device 206 which extends this pulse width to the duration, proportional to $r_i'$, of the pulse generated by the converter 202. The input signals $s_j$ then enter the gate 208 which is kept open for the same duration, also determined by the pulse width from the converter 202. If, due to a small amplitude of $r_i'$ the width of the latter pulses is reduced below the standard width of $s_j$, the gate 208 remains open only the reduced duration of the pulses from the converter 202. It is this time of "open" gate 208 which then determines the width of the input signal $s_j$.

In order to retain the algebraic sign of the product $s_j r_i$, as required by the theory, the signal $r_i'$ is channeled from location 210 (where it still appears with both polarities) to a switch 212. In this switch the incoming signal $s_j$ is inverted if $r_i'$ is negative, and allowed to go through with its incoming polarity if $r_i'$ is positive. The switch 212 has been located in FIG. 15 after the gate 208 for the convenience of sequential description. A technically preferable location for this switch is before the "track-and-hold" device 206.

Finally, an "AND" gate 214 is included between location 204 and the gate 208 to suppress the passage of the incoming signal (and thereby of the product $s_j r_i$) when $r_i'$ is so small as to call for a pulse width narrower than the standard pulse width generated by 202. It is noted that a discontinuity thus occurs in the product $s_j r_i$ between the value determined by the narrowest pulses obtained from the converter 202, and zero. Such a feature is merely an aspect of what one can generally refer to as noise, and as may be inferred from the theory the Nestor module is particularly invulnerable to noise or in fact to the imperfect functioning of individual components. Furthermore, it is well within the established art in the field of electronic circuitry to bring about improvements of the signal-to-noise ratio in general and particularly a reduction of the discontinuity mentioned.

It should also be noted that since modifications to the $A_{ij}$ depend only on the input signals to and the output response of the nouveron of which that mnemonder is a part, the pulse widths and possible inversion due to $|r_i|$ and $r_i/|r_i|$ apply in the same way to each of the pulsed signals $s_1, s_2 \ldots, s_N$ entering the nouveron. Therefore most of the electronics indicated in FIG. 15, as will be evident to those skilled in the art, serves at the same time all of the mnemonders of a nouveron and thus is required only once for each nouveron.

The description of the specific preferred embodiment of the present invention is now complete. Although this embodiment has been described with reference to electrical signals and charges bearing the informational content of an information processing system, numerous other techniques for representing signals and for storing information will occur to those skilled in the art. It will also be understood that the present invention itself is susceptible to various modifications, changes, and adaptations which fall within its spirit and scope. For example, the algorithm for the modifications to A of the mnemonders need not be restricted to the fourth term of the Taylor series — namely, that term embodied in equation (5) above; rather, other terms such as the sixth term may provide equally powerful results. Accordingly, it is intended that the present invention may be limited only by the following claims and their equivalents.

We claim:

1. An information processing module comprising, in combination:
    a. a plurality (N) of input terminals $1, 2 \ldots, j \ldots, N$ adapted to receive N input signals $s_1, s_2 \ldots, s_j \ldots, s_N$, respectively;
    b. a plurality (n) of output terminals $1, 2 \ldots, i \ldots, n$ adapted to present n output responses $r_1, r_2 \ldots, r_i \ldots, r_n$, respectively;
    c. a plurality of junction elements, called mnemonders, each mnemonder coupling one of said input terminals (input j) with one of said output terminals (output i) and providing a transfer of information from input j to output i in dependence upon the signal $s_j$ appearing at the input j and upon the mnemonder transfer function $A_{ij}$; and
    d. means for modifying the transfer function $A_{ij}$ of at least one of said mnemonders, when in a learning mode, in dependence upon the product of at least one of said input signals and one of said output responses;
    whereby modifications to the transfer functions of the mnemonders, when in a learning mode, take the form:

$$\epsilon A_{ij} = f(s_1, s_2 \ldots, s_j \ldots, s_N; r_1, r_2 \ldots, r_i \ldots, r_n).$$

2. The information processing module defined in claim 1, wherein the number of output terminals equals the number of input terminals ($n = N$).

3. The information processing module defined in claim 1, wherein the number of output terminals is less than the number of input terminals ($n < N$).

4. The information processing module defined in claim 1, wherein the number of output terminals is greater than the number of input terminals ($n > N$).

5. The information processing module defined in claim 1, wherein at least one mnemonder is coupled to each one of said input terminals.

6. The information processing module defined in claim 1, wherein each one of said output terminals is coupled to at least one mnemonder.

7. The information processing module defined in claim 1, wherein at least one mnemonder is coupled to each input terminal and wherein each output terminal is coupled to at least one mnemonder.

8. The information processing module defined in claim 1, wherein each one of said input terminals is coupled to at least one of said output terminals through a mnemonder.

9. The information processing module defined in claim 1, wherein each one of said input terminals is coupled to each one of said output terminals through a mnemonder.

10. The information processing module defined in claim 1, wherein the output $s_j'$ of each mnemonder equals the product of its transfer function $A_{ij}$ and the signal $s_j$ applied at its input ($s_j' = A_{ij} s_j$).

11. The information processing module defined in claim 1, wherein said transfer function modifying means includes means for modifying the transfer function $A_{ij}$ of each of said mnemonders.

12. The information processing module defined in claim 1, wherein said transfer function modifying means includes means for modifying the transfer function $A_{ij}$ of at least one of said mnemonders in dependence upon the input signal $s_j$ applied thereto and the output response $r_i$ at the output terminal to which the mnemonder is coupled;
    whereby the modifications to the transfer function of at least one of the mnemonders take the form:

$$\epsilon A_{ij} = f(s_j, r_i).$$

13. The information processing module defined in claim 12, wherein said transfer function modifying means includes means for modifying the transfer function $A_{ij}$ of each one of said mnemonders in dependence upon the input signal $s_j$ applied thereto and the output response $r_i$ at the output terminal to which the mnemonder is coupled;
    whereby the modifications to the transfer function of each of the mnemonders take the form:

$$\epsilon A_{ij} = f(s_j, r_i).$$

14. The information processing module defined in claim 12, wherein said transfer function modifying means includes means for modifying the transfer function $A_{ij}$ of at least one of said mnemonders in proportion to the product of the input signal $s_j$ applied thereto and the output response $r_i$ at the output terminal to which the mnemonder is coupled;

whereby the modifications to the transfer function of at least one of the mnemonders take the form:

$$\epsilon A_{ij} = \eta\, s_j\, r_i.$$

where $\eta$ is the constant of proportionality.

15. The information processing module defined in claim 14, wherein said transfer function modifying means includes means for modifying the transfer function $A_{ij}$ of each one of said mnemonders in proportion to the product of the input signal $s_j$ applied thereto and the output response $r_i$ at the output terminal to which the mnemonder is coupled;

whereby the modifications to the transfer function of each of the mnemonders take the form:

$$\epsilon A_{ij} = \eta\, s_j\, r_i.$$

where $\eta$ is the constant of proportionality.

16. The information processing module defined in claim 1, further comprising logic element means, connected between each output terminal and the mnemonders coupled thereto, for receiving mnemonder outputs $s_j'$ and producing an output response $r_i$ in dependence upon said mnemonder outputs.

17. The information processing module defined in claim 16, wherein each of said logic element means produces said output response $r_i$ in proportion to the sum of the mnemonder outputs $s_j'$ applied thereto:

whereby said output response $r_i$ takes the form:

$$r_i \sim \sum_{j=1}^{N} s_j'.$$

18. The information processing module defined in claim 1, further comprising:

a plurality ($n$) of threshold means $T_1, T_2 \ldots, T_i \ldots, T_n$, each connected to one of said output terminals, for producing an output signal if the output response $r_i$ applied thereto is greater than a threshold level $\theta_i$ ($r_i > \theta_i$ or $|r_i| > \theta_i$).

19. The information processing module defined in claim 18, further comprising:

signal suppression means, connected to the outputs of each of said threshold means, for suppressing all of the output responses $r_1, r_2 \ldots, r_n$ except that response $r_i$ applied as an input to the threshold means $T_i$ which is producing an output signal.

20. The information processing module defined in claim 1, further comprising:

source means for selectively applying a specific desired output response $r_{iA}$ to at least one of said output terminals;

whereby said information processing module may be caused to provide a "correct" output response r during its operation.

21. An information processing system comprising, in combination:

a. at least one information processing module as defined in claim 1; and b. means for adjusting the transfer function $A_{ij}$ of each mnemonder of said module to a predetermined desired value, whereby the system may be trained in a single operation.

22. An information processing system comprising, in combination:

a. at least one information processing module as defined in claim 1; and b. means for selectively interrupting the operation of said modifying means of said module so that no modifications are made to the transfer function $A_{ij}$ of the mnemonders ($\epsilon A_{ij} = 0$), whereby the system may be operated as a pure memory.

23. An information processing system comprising, in combination:

a. at least one information processing module as defined in claim 1;

b. buffer storage means for storing the transfer function $A_{ij}$ of each mnemonder of said module; and c. means for selectively transferring the transfer function $A_{ij}$ of each mnemonder to said buffer storage means, whereby the transfer functions may be preserved for later use after a period of training of said module.

24. An information processing system comprising, in combination:

a. at least one information processing module as defined in claim 1;

b. buffer storage means for storing a plurality of transfer functions $A_{ij}$; and c. means for selectively transferring a transfer function $A_{ij}$ to at least one of said mnemonders of said module, whereby said module can be trained in a single operation.

25. An information processing system as defined in claim 24, wherein said transferring means includes means for selectively transferring the transfer function $A_{ij}$ of each mnemonder to said buffer storage means.

26. An information processing system comprising in combination:

a. a plurality of information processing modules as defined in claim 1;

b. means connecting the output terminals of at least one of said modules to the input terminals of at least one other of said modules, whereby at least two modules are connected in series.

27. The information processing system defined in claim 26, wherein the connecting means (b) includes means for connecting the output terminals of at least two of said modules to the input terminals of one other module, whereby at least two modules are connected in series to a third.

28. The information processing system defined in claim 26, wherein the connecting means (b) includes means for connecting the output terminals of one of said modules to the input terminals of at least two other modules, whereby one module is connected in series to at least two other modules.

29. The information processing system defined in claim 26, wherein the total number of output terminals of said at least one module is greater than the total number of input terminals of said at least one other module.

30. The information processing system defined in claim 26, wherein the total number of output terminals of said at least one module is equal to the total number of input terminals of said at least one other module.

31. The information processing system defined in claim 26, wherein the total number of output terminals of said at least one module is less than the total number of input terminals of said at least one other module.

32. An information processing system comprising, in combination:
   a. a plurality of information processing modules as defined in claim 1;
   b. means for connecting the output terminals of one of said modules to the input terminals of another, whereby at least two modules are connected in series.

33. The information processing system defined in claim 32, wherein said output terminals of one of said modules are connected to the input terminals of another in a random fashion.

34. The information processing system defined in claim 32, wherein the output terminals of one of said modules are connected to the input terminals of another in an ordered fashion,
   whereby each one of the output terminals of said one module is connected to one of the input terminals of said other module.

35. An information processing system comprising, in combination:
   a. a plurality of information processing modules as defined in claim 1;
   b. means for connecting the output terminals of one of said modules to the output terminals of another, whereby at least two modules are connected in parallel.

36. An information processing system comprising, in combination:
   a. a plurality of information processing modules as defined in claim 1;
   b. means for connecting the input terminals of one of said modules to the input terminals of another, whereby at least two modules are connected in parallel.

37. The information processing module defined in claim 1, further comprising:
   source means for selectively applying a specific desired output response $r_{iA}$ to each one of said output terminals;
   whereby said information processing module may be caused to provide a "correct" output response $r\omega$ during its operation.

38. The information processing module defined in claim 1, wherein said modifying means includes means for reducing the value of the transfer function $A_{ij}$ of at least one of said mnemonders with a decay at a predetermined rate.

39. The information processing module defined in claim 38, wherein said rate is constant, thereby to provide a uniform decay.

40. The information processing module defined in claim 1, wherein said modifying means includes means for reducing the value of the transfer function $A_{ij}$ of each one of said mnemonders with a decay at a predetermined rate.

41. The information processing module defined in claim 40, wherein said rate is constant, thereby to provide a uniform decay.

42. The information processing module defined in claim 1, wherein the input signals $s_1, s_2 \ldots, s_j \ldots, s_N$ and the output responses $r_1, r_2 \ldots, r_i \ldots, r_n$ are represented by voltage levels.

43. The information processing module defined in claim 42, wherein each of said mnemonders includes a gain controlled amplifier, the transfer function $A_{ij}$ of a mnemonder being represented by the gain of the mnemonder amplifier.

44. The information processing module defined in claim 1, wherein each mnemonder includes means for storing its transfer function $A_{ij}$.

45. The information processing module defined in claim 44, wherein said storage means comprises a device for storing an electrical charge.

46. The information processing module defined in claim 45, wherein said device is a capacitor.

47. The information processing module defined in claim 44, wherein said modifying means includes means for adding said increments $\epsilon A_{ij}$ to the stored transfer function $A_{ij}$ of a mnemonder.

48. The information processing module defined in claim 47, wherein electrical charge stored in said storage means of the $ij$'th mnemonder is $Q_{ij}$;
   wherein in each of said increments $\epsilon A_{ij}$ is proportional to a respective increment $\epsilon Q_{ij}$;
   and wherein said means for adding increments $\epsilon A_{ij}$ to the stored transfer function comprises, in combination:
   a. means for producing a first pulse having an amplitude proportional to the input signal $s_j$ and having a width $t_i$ proportional to the absolute value of the output response $r_i$; and
   b. means, connected to said pulse producing means, for applying a second pulse to said device for storing an electrical charge, the pulse height and pulse width of said second pulse being proportional to the pulse height and pulse width of said first pulse and the polarity of said second pulse being equal to $r_i/|r_i|$.

49. An information processing element comprising, in combination:
   a. a plurality (N) of input terminals $1, 2 \ldots, j \ldots, N$ adapted to receive N input signals $s_1, s_2 \ldots, s_j \ldots, s_N$, respectively;
   b. an output terminal $i$ adapted to present an output response $r_i$;
   c. a plurality (N) of junction elements, called mnemonders, each mnemonder coupling one of said input terminals (input $j$) to said output terminal (output $i$) and providing a transfer of information from input $j$ to output $i$ in dependence upon the signal $s_j$ appearing at the input $j$ and upon the mnemonder transfer function $A_{ij}$; and
   d. means for modifying the transfer function $A_{ij}$ of at least one of said mnemonders, when in a learning mode, in dependence upon the product of at least one of said input signals and said output response; whereby the modifications to the transfer function of the mnemonders, when in a learning mode, take the form:

$$\epsilon A_{ij} = f(s_1, s_2 \ldots, s_j \ldots, s_N; r_i).$$

50. The information processing element defined in claim 49, wherein said modifying means includes means for reducing the value of the transfer function $A_{ij}$ of each one of said mnemonders with a decay at a predetermined rate.

51. The information processing element defined in claim 50, wherein said rate is constant, thereby to provide a uniform decay.

52. The information processing element defined in claim 49, wherein the output $s_j'$ of each mnemonder equals the product of its transfer function $A_{ij}$ and the signal $s_j$ applied at its input $(s_j' = A_{ij} s_j)$.

53. The information processing element defined in claim 49, wherein said transfer function modifying means includes means for modifying the transfer function $A_{ij}$ of each of said mnemonders.

54. The information processing element defined in claim 49, wherein said transfer function modifying means includes means for modifying the transfer function $A_{ij}$ of at least one of said mnemonders in dependence upon the input signal $s_j$ applied thereto and the output response $r_i$ at the output terminal;

whereby the modifications to the transfer function of at least one of the mnemonders take the form:

$$\epsilon A_{ij} = f(s_j, r_i).$$

55. The information processing element defined in claim 54, wherein said transfer function modifying means includes means for modifying the transfer function $A_{ij}$ of each one of said mnemonders in dependence upon the input signal $s_j$ applied thereto and the output response $r_i$ at the output terminal;

whereby the modifications to the transfer function of each of the mnemonders take the form:

$$\epsilon A_{ij} = f(s_j, r_i).$$

56. The information processing element defined in claim 54, wherein said transfer function modifying means includes means for modifying the transfer function $A_{ij}$ of at least one of said mnemonders in proportion to the product of the input signal $s_j$ applied thereto and the output response $r_i$ at the output terminal;

whereby the modifications to the transfer function of at least one of the mnemonders take the form:

$$\epsilon A_{ij} = \eta\, s_j\, r_i,$$

where $\eta$ is the constant of proportionality.

57. The information processing element defined in claim 56, wherein said transfer function modifying means includes means for modifying the transfer function $A_{ij}$ of each one of said mnemonders in proportion to the product of the input signal $s_j$ applied thereto and the output response $r_i$ at the output terminal;

whereby the modifications to the transfer function of each of the mnemonders take the form:

$$\epsilon A_{ij} = \eta\, s_j\, r_i,$$

where $\eta$ is the constant of proportionality.

58. The information processing element defined in claim 49, further comprising logic element means, connected between said output terminal and the mnemonders coupled thereto, for receiving mnemonder outputs $s_j'$ and producing an output response $r_i$ in dependence upon said mnemonder outputs.

59. The information processing element defined in claim 58, wherein said logic element means produces said output response $r_i$ in proportion to the sum of the mnemonder outputs $s_j'$ applied thereto;

whereby said output response $r_i$ takes the form:

$$r_i = \sum_{j=1}^{N} s_j'.$$

60. The information processing element defined in claim 49, further comprising:

a threshold means $T_i$, connected to said output terminal, for producing an output signal if the output response $r_i$ applied thereto is greater than a threshold level $\theta_i$ ($r_i > \theta_i$ or $r_i > \theta_i$).

61. The information processing element defined in claim 49, further comprising:

source means for selectively applying a specific desired output response $r_{iA}$ to said output terminal;

whereby said information processing module may be caused to provide a "correct" output response $r$ during its operation.

62. The information processing element defined in claim 49, wherein said modifying means includes means for reducing the value of the transfer function $A_{ij}$ of at least one of said mnemonders with a decay at a predetermined rate.

63. The information processing element defined in claim 62, wherein said rate is constant, thereby to provide a uniform decay.

64. The information processing element defined in claim 49, wherein the signals $s_1, s_2 \ldots, s_j \ldots, s_N$ and $r_i$ are represented by voltage levels.

65. The information processing element defined in claim 64, wherein each of said mnemonders includes a gain controlled amplifier, the transfer function $A_{ij}$ of a mnemonder being represented by the gain of the mnemonder amplifier.

66. The information processing element defined in claim 49, wherein each mnemonder includes means for storing its transfer function $A_{ij}$.

67. The information processing element defined in claim 66, wherein said storage means comprises a device for storing an electrical charge.

68. The information processing element defined in claim 67, wherein said device is a capacitor.

69. The information processing element defined in claim 66, wherein said modifying means includes means for adding said increments $\epsilon A_{ij}$ to the stored transfer function $A_{ij}$ of a mnemonder.

70. The information processing element defined in claim 69, wherein electrical charge stored in said storage means of the $ij$'th mnemonder is $Q_{ij}$;

wherein in each of said increments $\epsilon A_{ij}$ is proportional to a respective increment $\epsilon Q_{ij}$;

and wherein said means for adding increments $\epsilon A_{ij}$ to the stored transfer function comprises, in combination:

a. means for producing a first pulse having an amplitude proportional to the input signal $s_j$ and having a width $t_i$ proportional to the absolute value of the output response $r_i$; and b. means, connected to said pulse producing means, for applying a second pulse to said device for storing an electrical charge, the pulse height and pulse width of said second pulse being proportional to the pulse height and pulse width of said first pulse and the polarity of said second pulse being equal to $r_i/|r_i|$.

71. A process of using an information processing module which comprises, in combination:

a. a plurality (N) of input terminals $1, 2 \ldots, j \ldots, N$ adapted to receive N input signals $s_1, s_2 \ldots, s_j \ldots, s_N$, respectively;

b. a plurality ($n$) of output terminals $1, 2 \ldots, i \ldots, n$ adapted to present $n$ output responses $r_1, r_2 \ldots, r_i \ldots, r_n$, respectively;

c. a plurality of junction elements, each coupling one of said input terminals with one of said output terminals and providing a transfer of information from input $j$ to output $i$ in dependence upon the signal $s_j$ appearing at the input $j$ and upon the junction element transfer function $A_{ij}$, said junction elements coupling said input and output terminals in such a way that each output response $r_i$ is a function of a plurality of transfer functions $A_{ij}$ and a plurality of input signals $s_j$;

said process comprising the steps of:

1. setting the transfer function $A_{ij}$ of each junction element to a particular desired value representing stored information;
2. applying at least one of said input signals $s_1, s_2 \ldots, s_j \ldots, s_N$ to the respective input terminal; and
3. receiving at least one of said output responses $r_1, r_2 \ldots, r_i \ldots, r_n$ at the respective output terminal, whereby said module is utilized as a distributed memory.

72. The process defined in claim 71, wherein the number of output terminals of the information processing module equals the number of input terminals thereof ($n = N$).

73. The process defined in claim 71, wherein the number of output terminals of the information processing module is less than the number of input terminals thereof ($n < N$).

74. The process defined in claim 71, wherein the number of output terminals of the information processing module is greater than the number of input terminals thereof ($n > N$).

75. The process defined in claim 71, wherein at least one junction element of the information processing module is coupled to each one of said input terminals thereof.

76. The process defined in claim 71, wherein each one of said output terminals of the information processing module is coupled to at least one junction element thereof.

77. The process defined in claim 71, wherein at least one junction element of the information processing module is coupled to each input terminal thereof and wherein each output terminal of the information processing module is coupled to at least one junction element thereof.

78. The process defined in claim 71, wherein each one of said input terminals of the information processing module is coupled to at least one of said output terminals thereof through a junction element.

79. The process defined in claim 71, wherein each one of said input terminals of the information processing module is coupled to each one of said output terminals thereof through a junction element.

80. The process defined in claim 71, wherein the output $s_j'$ of each junction element of the information processing module equals the product of its transfer function $A_{ij}$ and the signal $s_j$ applied at its input ($s_j' = A_{ij} s_j$).

81. The process defined in claim 71, wherein the information processing module further comprises logic element means, connected between each output terminal and the junction elements coupled thereto, for receiving junction element outputs $s_j'$ and producing an output response $r_i$ in dependence upon said junction element outputs.

82. The process defined in claim 81, wherein each of said logic element means produces said output response $r_i$ in proportion to the sum of the junction element outputs $s_j'$ applied thereto;

whereby said output response $r_i$ takes the form:

$$r_i \sim \sum_{j=1}^{N} s_j'.$$

83. A method of processing information comprising the steps of:

a. receiving a plurality of input signals $s_1, s_2 \ldots, s_j \ldots, s_N$;
b. producing a plurality of intermediate signals $s'_{i1}, s'_{i2}, \ldots s'_{ij} \ldots, s'_{iN}$, each $s'_{ij}$ of which is dependent upon a respective one of said input signals $s_j$ and an associated transfer function $A_{ij}$;
c. producing an output response $r_i$ which is dependent upon at least one of said intermediate signals $s'_{ij}$; and
d. modifying at least one of said transfer functions $A_{ij}$, when in a learning mode, in dependence upon the product of at least one of said input signals $s_j$ and said output response $r_i$.

84. The method defined in claim 83, wherein each intermediate signal $s'_{ij}$ equals the product of the respective input signal $s_j$ and the associated transfer function $A_{ij}$ ($s'_{ij} = A_{ij} s_j$).

85. The method defined in claim 83, wherein said output response $r_i$ is dependent upon all of said intermediate signals $s'_{ij}$.

86. The method defined in claim 83, wherein said output response $r_i$ is proportional to the sum of a plurality of said intermediate signals $s'_{ij}$.

87. The method defined in claim 86, wherein said output response $r_i$ is proportional to the sum of all of said intermediate signals $s'_{ij}$.

88. The method defined in claim 83, wherein step (d) includes the step of modifying each of said transfer functions $A_{ij}$ in dependence upon the product of at least one of said input signals $s_j$ and said output response $r_i$.

89. The method defined in claim 83, wherein step (d) includes the step of modifying at least one of said transfer functions $A_{ij}$ in dependence upon the product of the input signal $s_j$, associated therewith, and said output response $r_i$.

90. The method defined in claim 89, wherein step (d) includes the step of modifying each of said transfer functions $A_{ij}$ in dependence upon the product of the input signal $s_j$, associated therewith, and said output response $r_i$.

91. The method defined in claim 83, wherein step (d) includes the step of modifying at least one of said transfer functions $A_{ij}$ in proportion to the product of the input signal $s_j$, associated therewith, and said output response $r_i$.

92. The method defined in claim 83, wherein step (d) includes the step of modifying each one of said transfer functions $A_{ij}$ in proportion to the product of the input signal $s_j$, associated therewith, and the output response $r_i$.

93. The method defined in claim 83, wherein step (c) includes the step of producing a plurality of output responses $r_1, r_2 \ldots, r_i \ldots, r_n$, each response $r_i$ of which is dependent upon at least one of said intermediate signals $s'_{ij}$, where $j$ varies from 1 to N.

94. The method defined in claim 93, further comprising the step of setting at least one of said output responses $r_i$ equal to a specific desired output response $r_{iA}$.

95. The method defined in claim 93, further comprising the step of setting each of said output responses $r_1, r_2 \ldots, r_i \ldots, r_n$ equal, respectively, to a specific desired output response $r_{1A}, r_{2A} \ldots, r_{iA} \ldots, r_{nA}$.

96. The method defined in claim 93, further comprising the step of suppressing all the output responses $r_1, r_2 \ldots, r_n$ accept that response $r_i$ which exceeds a prescribed threshold.

97. The method defined in claim 93, wherein step (c) includes the step of producing plurality of output responses $r_1, r_2 \ldots, r_i \ldots, r_n$, each response $r_i$ of which is dependent upon all of said intermediate signals $s'_{ij}$, where $j$ varies from 1 to N.

98. The method defined in claim 93, wherein step (c) includes the step of producing a plurality of output responses $r_1, r_2 \ldots, r_i \ldots r_n$, each response $r_i$ of which is proportional to the sum of a plurality of said intermediate signals $s'_{ij}$, where $j$ varies from 1 to N.

99. The method defined in claim 98, wherein step (c) includes the step of producing a plurality of output responses $r_1, r_2 \ldots, r_i \ldots r_n$, each response $r_i$ of which is proportional to the sum of all of said intermediate signals $s'_{ij}$, where $j$ varies from 1 to N.

100. The method defined in claim 83, further comprising the steps of:
 1. receiving a second plurality of input signals $s^2_1, s^2_2 \ldots, s^2_j \ldots, s^2_N$;
 2. producing a second plurality of intermediate signals $s'^2_{i1}, s'^2_{i2} \ldots, s'^2_{ij} \ldots, s'^2_{iN}$, each $s'^2_{ij}$ of which is dependent upon a respective one of said second input signals $s^2_j$ and upon said transfer function $A_{ij}$ that is associated with a respective one of the first intermediate signals $s'_{ij}$ produced in step (b); and
 3. producing a second output response $r^2_i$ which is dependent upon at least one of said second intermediate signals $s'^2_{ij}$.

101. The method defined in claim 83, further comprising the step of storing each of said transfer functions $A_{ij}$ in a storage device.

102. The method defined in claim 101, further comprising the step of transferring at least one of the stored transfer functions $A_{ij}$ to another storage device.

103. The method defined in claim 101, further comprising the step of transferring each of the stored transfer functions $A_{ij}$ to another storage device.

* * * * *

UNITED STATES PATENT AND TRADEMARK OFFICE
CERTIFICATE OF CORRECTION

PATENT NO. : 3,950,733
DATED : April 13, 1976
INVENTOR(S) : Cooper et al.

It is certified that error appears in the above-identified patent and that said Letters Patent are hereby corrected as shown below:

In each of the places indicated below, insert the word --adaptive-- before the word "module":

In the abstract, line 2 (second occurrence);

In the abstract, line 18;

Col. 4, line 23;

Col. 4, line 29;

Col. 4, line 32;

Col. 4, line 35;

Col. 4, line 38;

Col. 4, line 43;

Col. 4, line 46;

Col. 4, line 48;

Col. 4, line 51;

Col. 5, line 39;

Col. 5, line 58;

Col. 6, line 3;

UNITED STATES PATENT AND TRADEMARK OFFICE
CERTIFICATE OF CORRECTION

PATENT NO. : 3,950,733
DATED : April 13, 1976
INVENTOR(S) : Cooper et al.

It is certified that error appears in the above—identified patent and that said Letters Patent are hereby corrected as shown below:

| | |
|---|---|
| Col. 6, line 15; | Col. 8, line 43; |
| Col. 6, line 22; | Col. 8, line 47; |
| Col. 6, line 29; | Col. 8, line 62; |
| Col. 6, line 37; | Col. 8, line 65; |
| Col. 6, line 42; | Col. 9, line 2; |
| Col. 6, line 44; | Col. 9, line 9; |
| Col. 6, line 53; | Col. 9, line 14; |
| Col. 6, line 61; | Col. 9, line 19; |
| Col. 7, line 6; | Col. 9, line 31; |
| Col. 7, line 33; | Col. 9, line 38; |
| Col. 7, line 57; | Col. 9, line 51; |
| Col. 7, line 60; | Col. 9, line 65; |
| Col. 7, line 66; | Col. 10, line 1; |
| Col. 8, line 20; | Col. 10, line 7; |
| Col. 8, line 25; | Col. 10, line 11; |
| Col. 8, line 33; | Col. 10, line 15; |
| Col. 8, line 34; | Col. 10, line 17; |

UNITED STATES PATENT AND TRADEMARK OFFICE
CERTIFICATE OF CORRECTION

PATENT NO. : 3,950,733
DATED : April 13, 1976
INVENTOR(S) : Cooper et al.

It is certified that error appears in the above-identified patent and that said Letters Patent are hereby corrected as shown below:

| | |
|---|---|
| Col. 10, line 28; | Col. 17, line 56; |
| Col. 10, line 36; | Col. 18, line 9; |
| Col. 10, line 39; | Col. 18, line 12; |
| Col. 10, line 41; | Col. 18, line 19; |
| Col. 10, line 53; | Col. 24, line 52; |
| Col. 11, line 6; | Col. 24, line 58; |
| Col. 11, line 11; | Col. 25, line 15; |
| Col. 12, line 10; | Col. 26, line 41; |
| Col. 12, line 19; | Col. 26, line 43; |
| Col. 12, line 23; | Col. 26, line 47; |
| Col. 17, line 1; | Col. 26, line 51; |
| Col. 17, line 21; | Col. 26, line 55; |
| Col. 17, line 23; | |
| Col. 17, line 25; | |
| Col. 17, line 44; | |
| Col. 17, line 49; | |

UNITED STATES PATENT AND TRADEMARK OFFICE
CERTIFICATE OF CORRECTION

PATENT NO. : 3,950,733
DATED : April 13, 1976
INVENTOR(S) : Cooper et al.

It is certified that error appears in the above-identified patent and that said Letters Patent are hereby corrected as shown below:

In the abstract, line 4, "$S_N$" should read --$s_N$--;

Col. 5, line 6, "...,J...," should read --...,$j$...,--;

Col. 8, line 40, "appplying" should read --applying--;

Col. 10, line 64, "wiith" should read --with--;

Col. 11, line 20, "mappiing" should read --mapping--;

Col. 11, line 17, delete the word "Nestor";

Col. 13, line 1, "$\equiv R \equiv \Sigma\ c_{\mu\nu}\ r^\nu \times s^\nu$" should read -- $\equiv R \equiv \Sigma_\nu\ c_{\nu\nu}\ r^\nu \times s^\nu$ --;

Col. 13, line 6, "$\ell$" should read --e--;

Col. 13, line 65, "R $S^\lambda$" should read --R $s^\lambda$--;

Col. 14, line 10, "say s ," should read --say $s^\lambda_1$,--;

UNITED STATES PATENT AND TRADEMARK OFFICE
CERTIFICATE OF CORRECTION

PATENT NO. : 3,950,733
DATED : April 13, 1976
INVENTOR(S) : Cooper et al.

It is certified that error appears in the above-identified patent and that said Letters Patent are hereby corrected as shown below:

Col. 14, line 11, "$c_{\lambda\lambda}$" should read --$c_{\lambda\lambda}$--;

Col. 15, line 11, "set vectors" should read --set of vectors--;

Col. 15, line 13, "R" should read --$\mathcal{R}$--;

Col. 15, line 18, "$C_{uu}$" should read --$c_{uu}$--;

Col. 15, lines 61 and 62, "particular" should read --particulars--;

Col. 15, line 67, "$\{s^a$ " should read --$\{s^a\}$--;

Col. 16, line 15, "vector" should read --vectors--;

Col. 16, line 54, "is not all" should read --is not at all--;

Col. 17, line 24, "or" should read --of--;

Col. 17, line 29, "2" should read --(2)--;

Col. 17, line 42, "3" should read --(3)--;

Col. 19, line 5, "characteristics" should read --characteristic--;

Col. 19, line 41, "$\gamma s^t$" should read --$\epsilon\gamma s^t$--;

Col. 20, line 8, "$A \nu r^\nu$" should read --$A \sim r^\nu$--;

Col. 21, line 59, "$s^\beta$" should read --$s^\alpha$--;

UNITED STATES PATENT AND TRADEMARK OFFICE
CERTIFICATE OF CORRECTION

PATENT NO. : 3,950,733
DATED : April 13, 1976
INVENTOR(S) : Cooper et al.

It is certified that error appears in the above—identified patent and that said Letters Patent are hereby corrected as shown below:

Col. 23, line 4, "$e^{\ell}/2$" should read --$e^{\ell\varepsilon}/2$--;

Col. 25, line 37, "5" should read --(5)--;

Col. 26, line 13, "$\varepsilon Q$" should read --$\delta Q$--;

Col. 28, line 16, "porvisions" should read --provisions--;

Col. 30, line 5, "$\varepsilon$" should read --$\delta$--;

Col. 30, line 52, "$\varepsilon$" should read --$\delta$--;

Col. 30, line 64, "$\varepsilon$" should read --$\delta$--;

Col. 31, line 7, "$\varepsilon$" should read --$\delta$--;

Col. 31, line 19, "$\varepsilon$" should read --$\delta$--;

Col. 31, line 58, "r" should read --$r^{\omega}$--;

Col. 32, line 8, "$\varepsilon$" should read --$\delta$--;

Col. 34, line 16, "$\varepsilon$" should read --$\delta$--;

Col. 34, lines 21, 22 and 23, "$\varepsilon$" should read --$\delta$--;

Col. 34, line 59, "$\varepsilon$" should read --$\delta$--;

Col. 35, line 18, "$\varepsilon$" should read --$\delta$--;

Col. 35, line 28, "$\varepsilon$" should read --$\delta$--;

UNITED STATES PATENT AND TRADEMARK OFFICE
CERTIFICATE OF CORRECTION

PATENT NO. : 3,950,733
DATED : April 13, 1976
INVENTOR(S) : Cooper et al.

It is certified that error appears in the above-identified patent and that said Letters Patent are hereby corrected as shown below:

Col. 35, line 39, "$\varepsilon$" should read --$\delta$--;

Col. 35, line 50, "$\varepsilon$" should read --$\delta$--;

Col. 36, line 40, "$\varepsilon$" should read --$\delta$--;

Col. 36, lines 45, 46 and 47, "$\varepsilon$" should read --$\delta$--;

Col. 40, line 8, "$s'^2_{i\ell}$" should read --$s'^2_{i1}$--.

Signed and Sealed this

Eighth Day of February 1977

[SEAL]

Attest:

RUTH C. MASON
Attesting Officer

C. MARSHALL DANN
Commissioner of Patents and Trademarks